(12) United States Patent
Durant

(10) Patent No.: US 11,755,064 B2
(45) Date of Patent: Sep. 12, 2023

(54) DEVICES, SYSTEMS, AND METHODS FOR DISPLAYING VISUAL FEATURES

(71) Applicant: Silas Jeffrey Durant, Scottdale, GA (US)

(72) Inventor: Silas Jeffrey Durant, Scottdale, GA (US)

( * ) Notice: Subject to any disclaimer, the term of this patent is extended or adjusted under 35 U.S.C. 154(b) by 0 days.

(21) Appl. No.: 17/172,507

(22) Filed: Feb. 10, 2021

(65) Prior Publication Data
US 2021/0165445 A1    Jun. 3, 2021

Related U.S. Application Data

(63) Continuation of application No. 16/360,694, filed on Mar. 21, 2019, now Pat. No. 10,921,851.

(60) Provisional application No. 62/646,548, filed on Mar. 22, 2018.

(51) Int. Cl.
*G06F 1/16* (2006.01)
*G06F 3/147* (2006.01)
*G06F 3/14* (2006.01)

(52) U.S. Cl.
CPC .......... *G06F 1/1601* (2013.01); *G06F 1/1624* (2013.01); *G06F 3/147* (2013.01); *G06F 3/1446* (2013.01)

(58) Field of Classification Search
CPC ....................................................... H05K 5/00
See application file for complete search history.

(56) References Cited

U.S. PATENT DOCUMENTS

2006/0185211 A1* 8/2006 Dalsey .................. A47G 1/065
40/729

* cited by examiner

*Primary Examiner* — Jerry Wu
(74) *Attorney, Agent, or Firm* — BALLARD SPAHR LLP

(57) ABSTRACT

Disclosed herein are devices, systems, and methods for selectively arranging a plurality of visual features. The systems and methods include the use of a plurality of display assemblies. Each display assembly can have a frame with side portions that define receiving spaces for receiving connectors that allow for coupling with other display assemblies. The display assemblies can be provided with a mount subassembly that permits selective rotational adjustment of the display assemblies without adjusting the attachment of mount assembly to a selected surface.

14 Claims, 17 Drawing Sheets

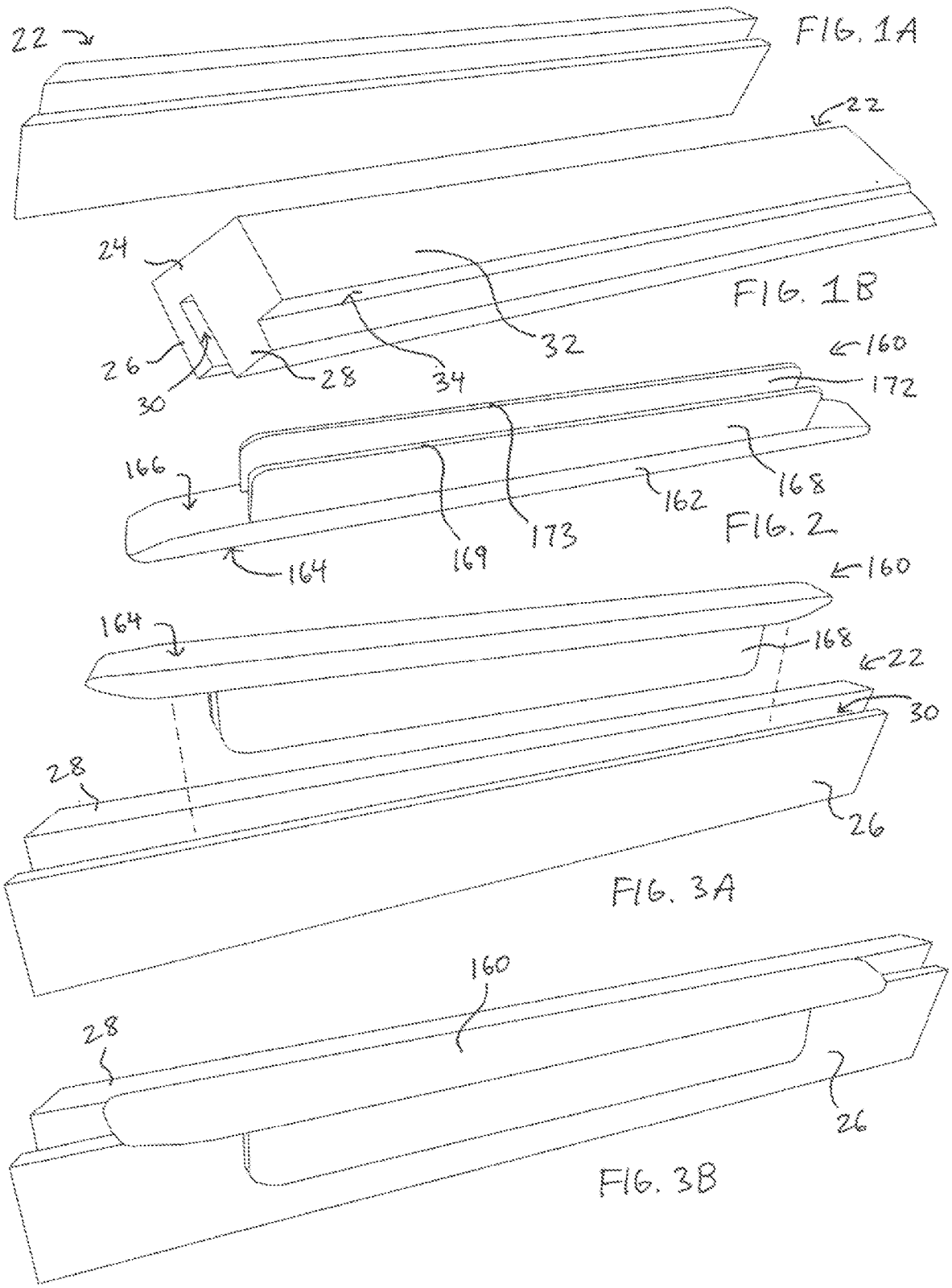

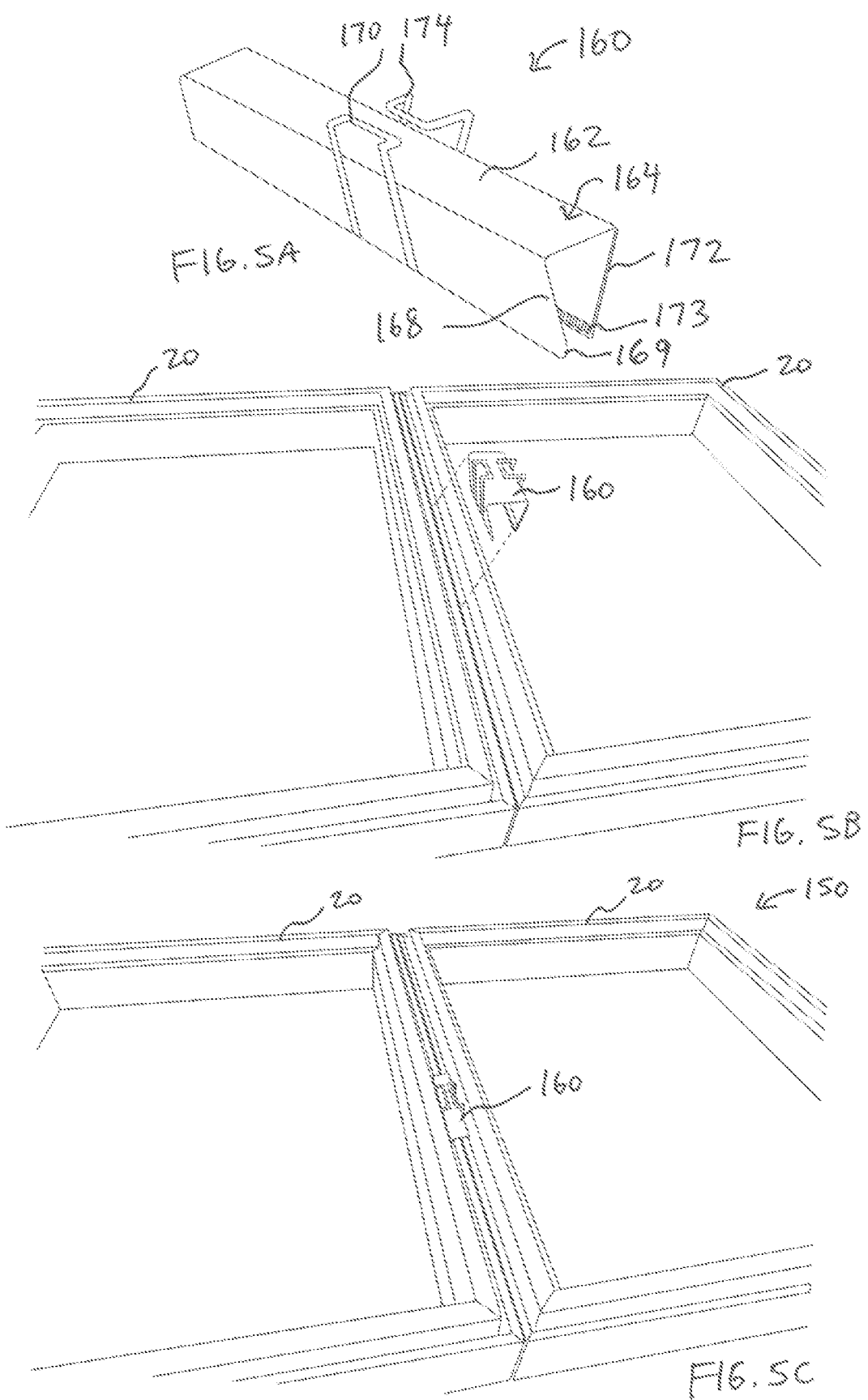

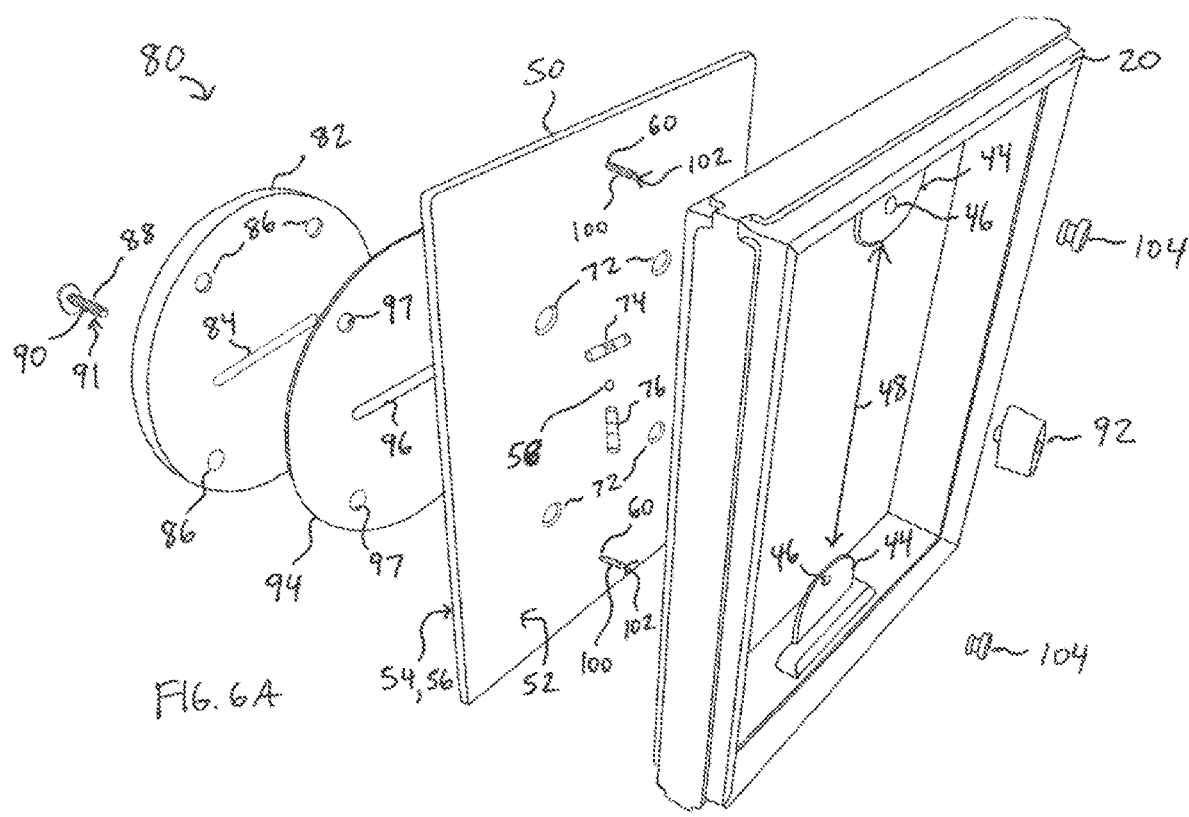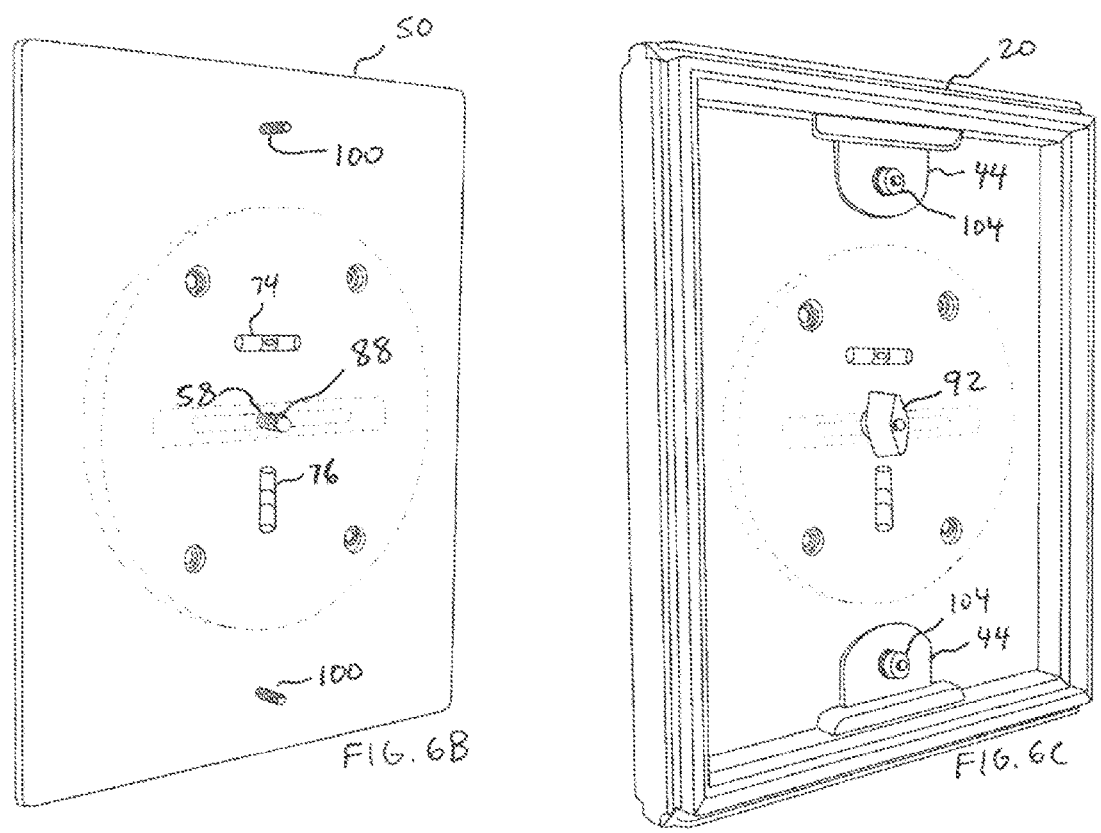

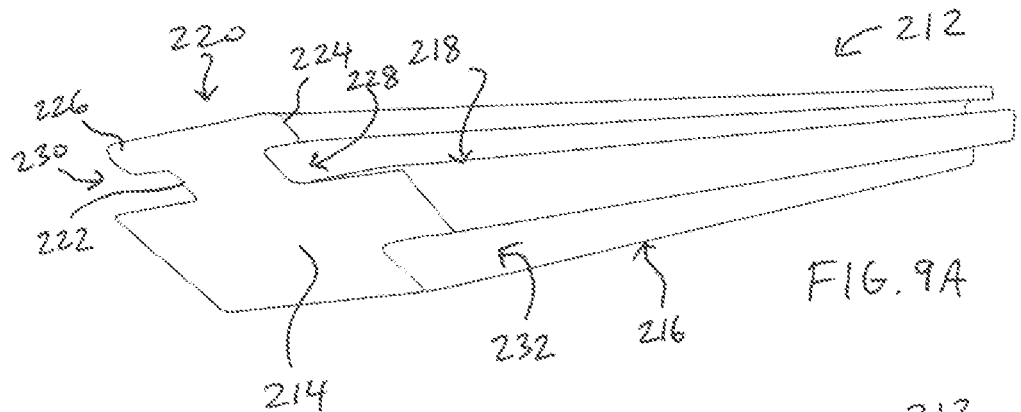
FIG. 9A
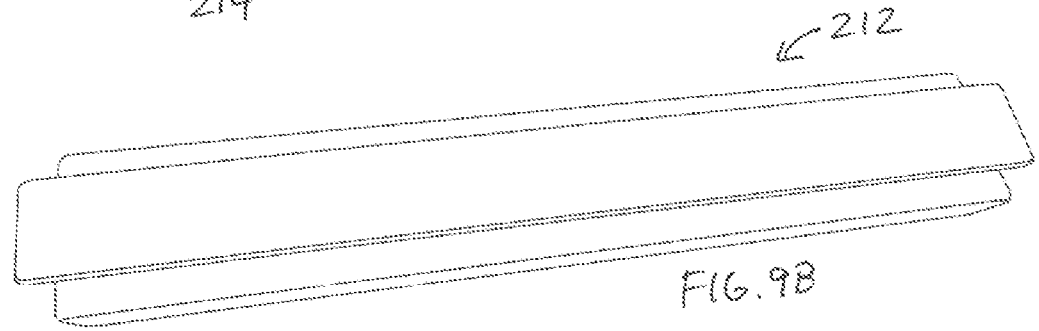
FIG. 9B
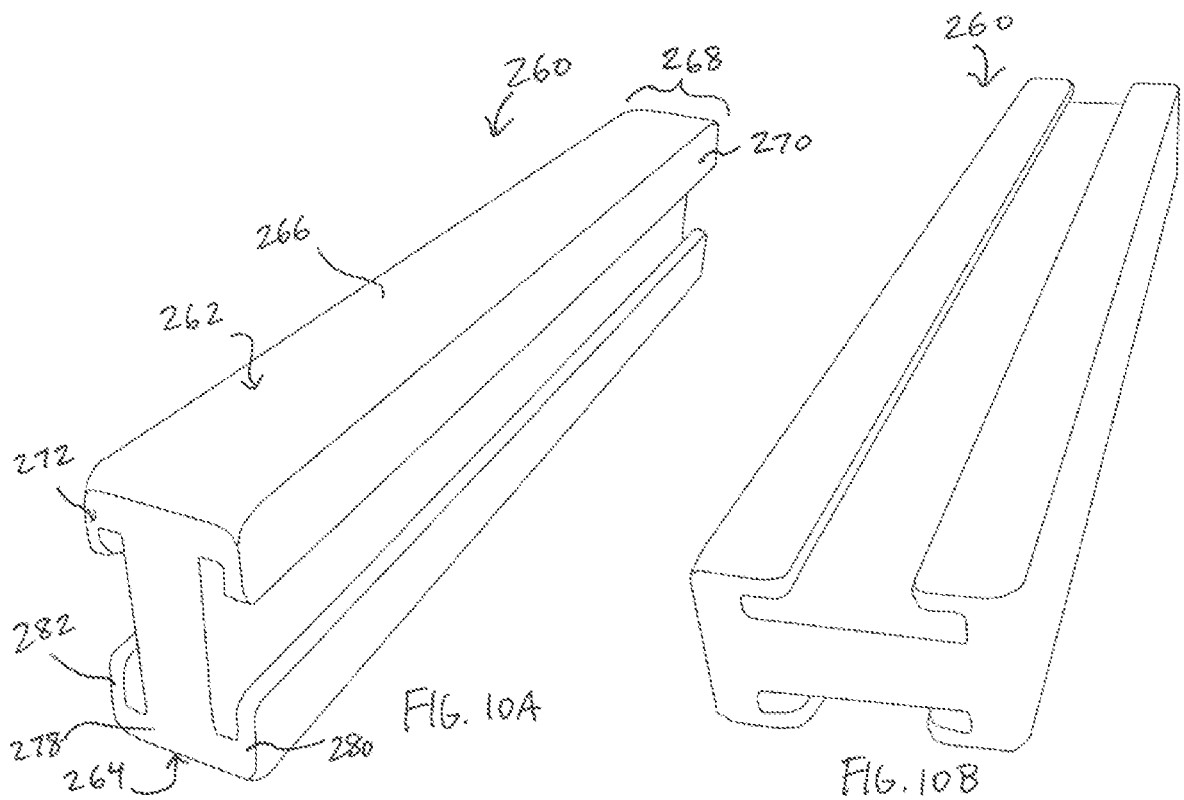
FIG. 10A
FIG. 10B

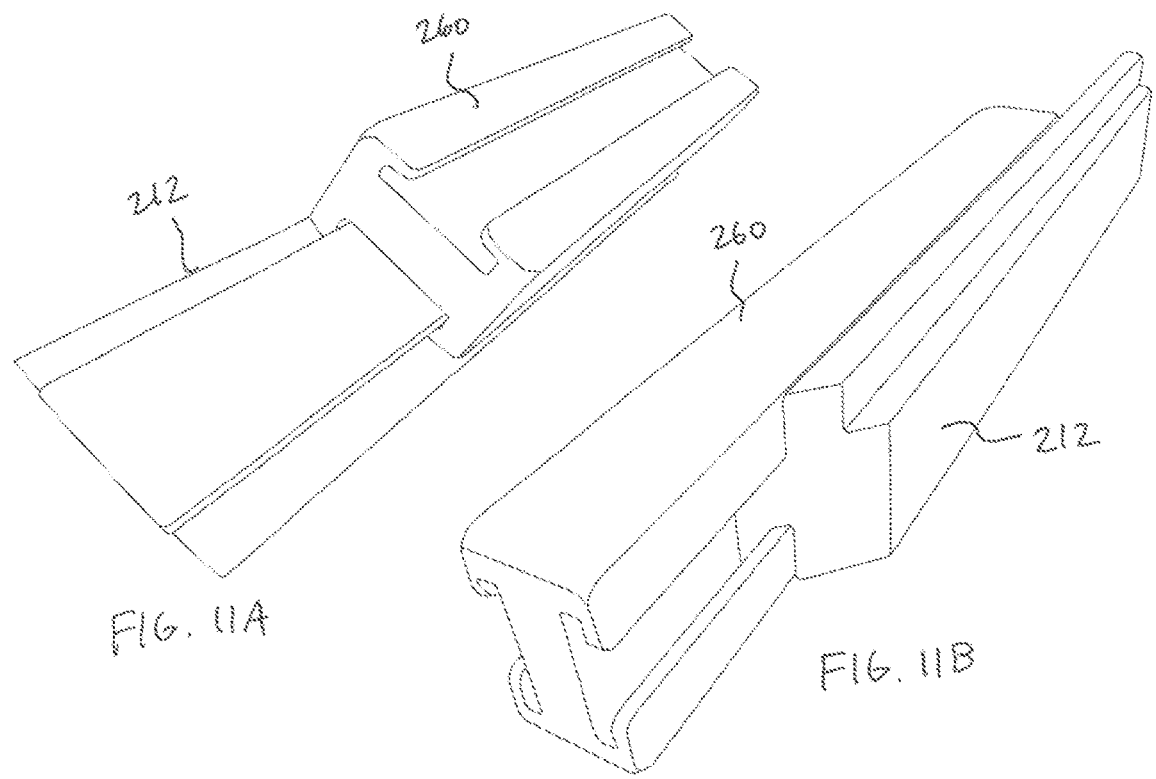
FIG. 11A
FIG. 11B
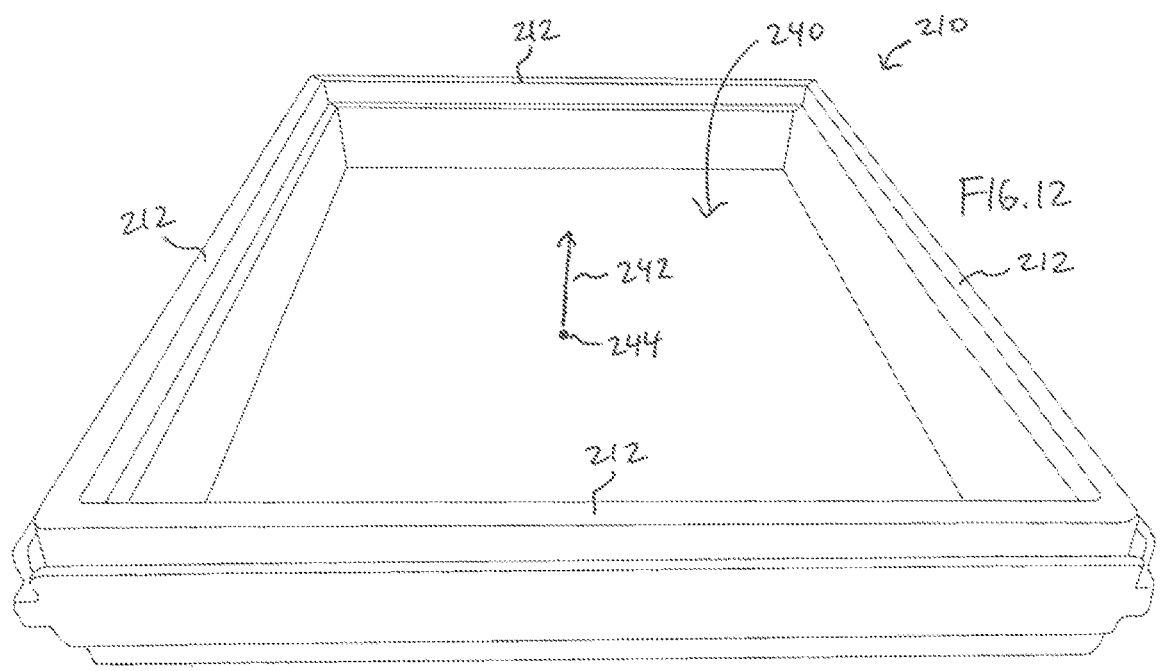
FIG. 12

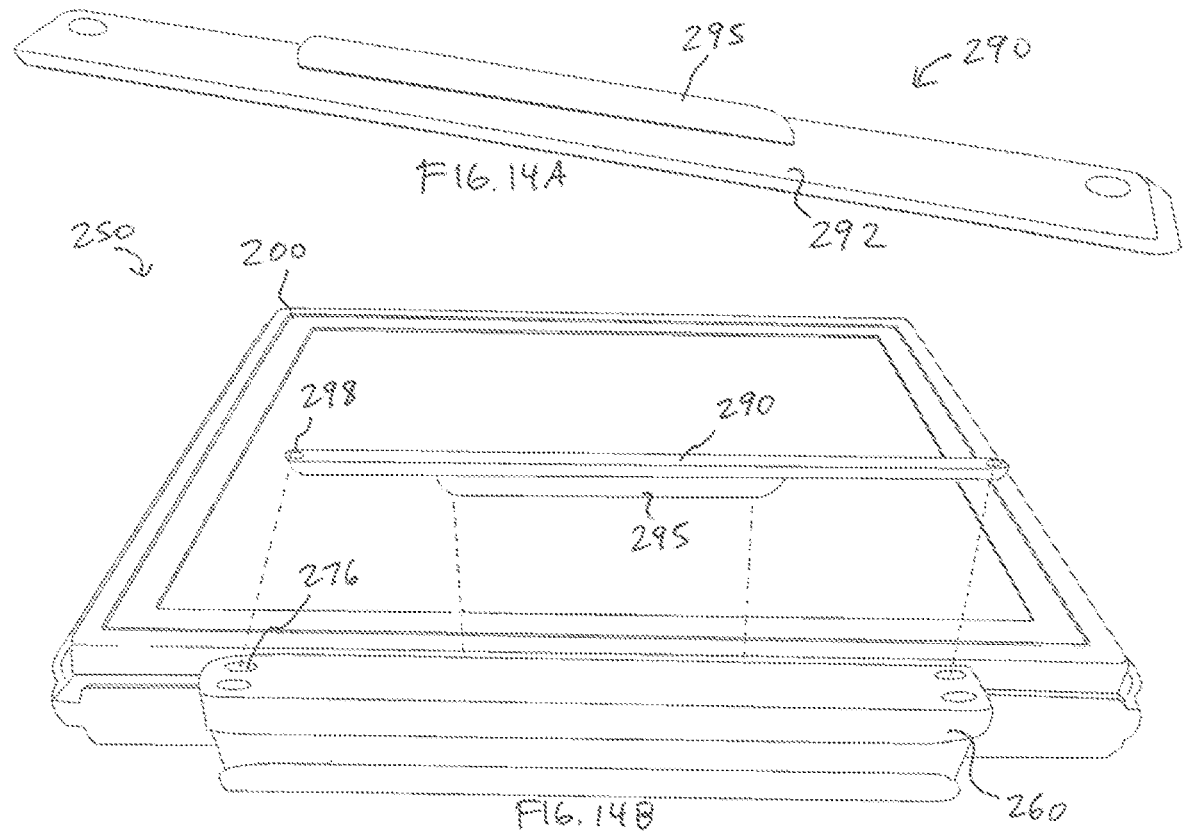
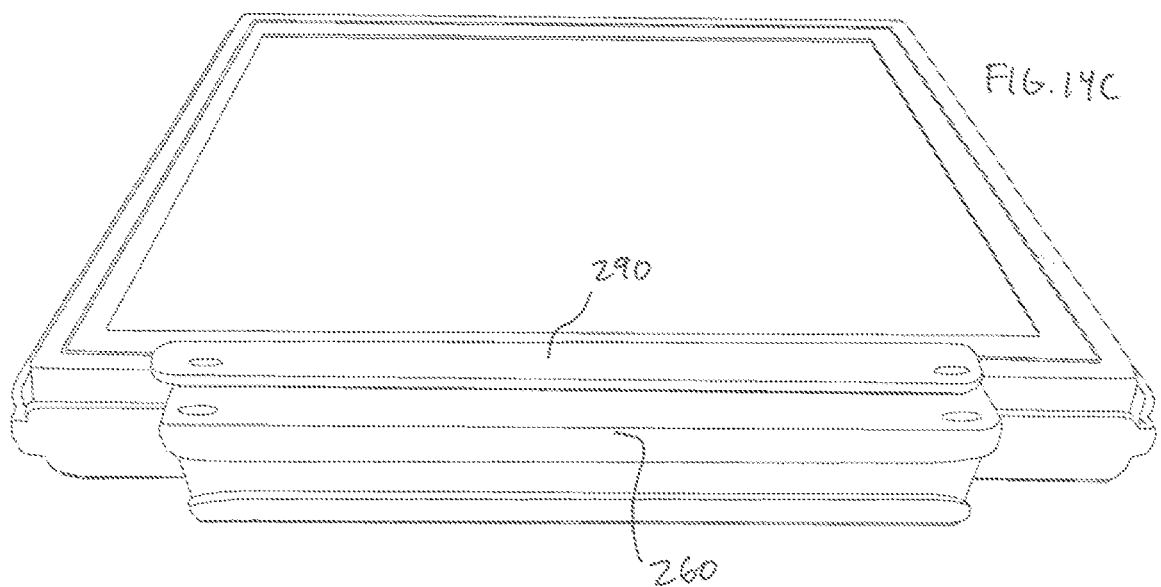

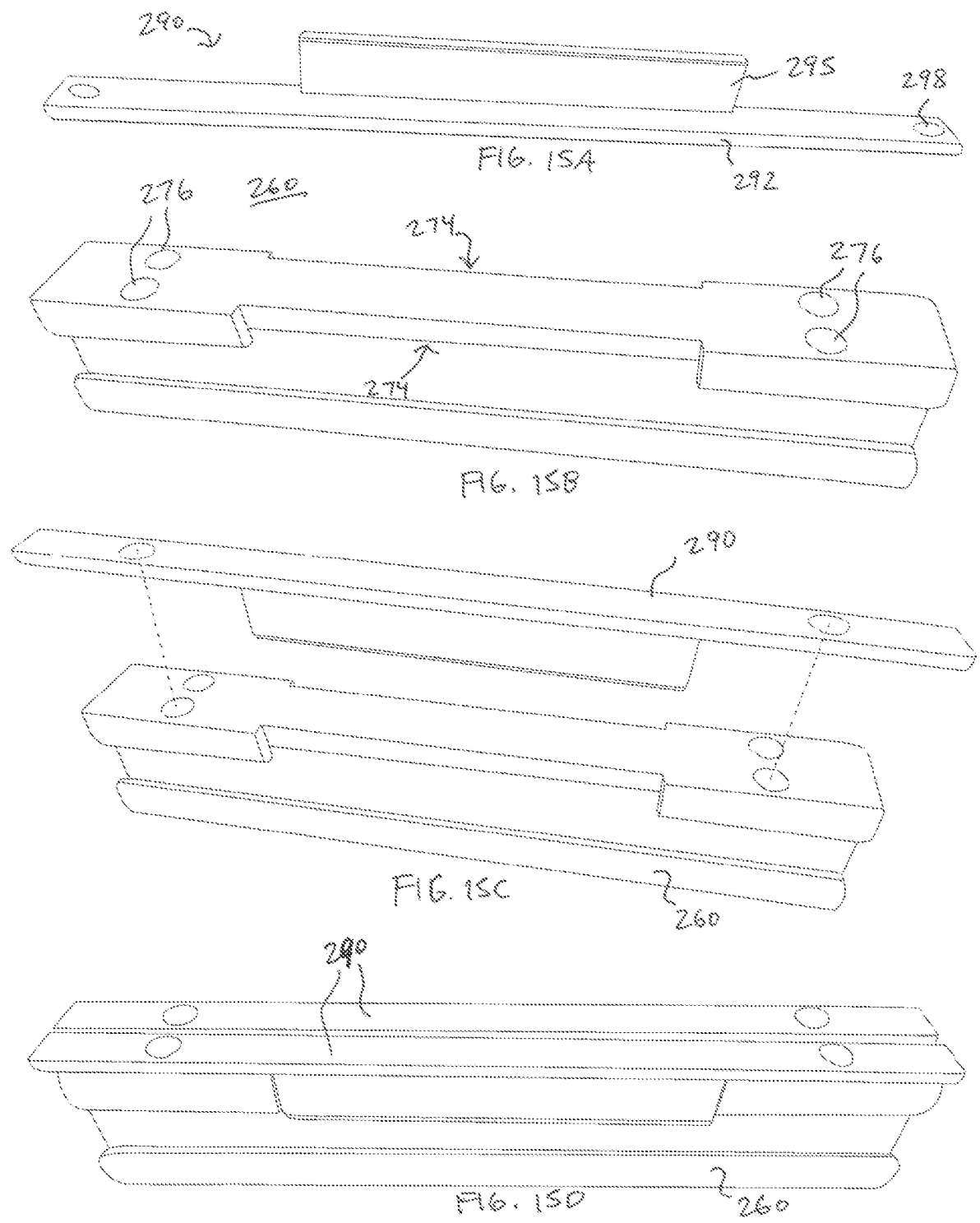

DEVICES, SYSTEMS, AND METHODS FOR DISPLAYING VISUAL FEATURES

CROSS-REFERENCE TO RELATED APPLICATIONS

This application is a continuation of U.S. patent application Ser. No. 16/360,694, which was filed on Mar. 21, 2019, and which claims priority to and the benefit of the filing date of U.S. Provisional Patent Application No. 62/646,548, which was filed on Mar. 22, 2018. Each of these applications is incorporated herein by reference in its entirety.

FIELD

The present invention is related to devices, systems, and methods for selectively displaying visual features. More specifically, systems and methods are provided for selectively positioning at least two display assemblies relative to each other as desired by the user.

BACKGROUND

Various types of frames (e.g., collage frames) have been used to display images and other visual features. For example, groups of frames have been positioned in clusters or groups to create a desired visual effect. However, to secure these frames in a desired orientation, each frame must be permanently secured to a wall (or other surface) and optionally, must be permanently secured to another frame. Thus, after the frames are secured in the desired orientation, it is difficult and time-consuming to rearrange the frames, leaving the user with little discretion as to the orientation of the frames and the overall size and shape of the display created by the frames.

Accordingly, there remains a need for devices and systems for selectively arranging a plurality of visual features in an orientation as determined by the user. This need and other needs are satisfied by the various aspects of the present disclosure.

SUMMARY

Disclosed herein, in various aspects, are devices, systems, and methods for selectively arranging a plurality of visual features.

In one aspect, disclosed herein are display assemblies for displaying at least one visual feature. In this aspect, the display assembly can comprise a frame. The frame can have a plurality of side portions that cooperate to define a central opening that is configured to receive at least one visual feature. At least one side portion of the frame can comprise (a) a base portion defining a portion of a rear surface of the frame; and (b) first and second projections extending from the base portion in a first direction away from the rear surface of the frame. The first and second projections can define a receiving space that extends along a length of the side portion. The receiving space can be configured to at least partially receive a portion of a connector that is inserted into the receiving space in a second direction opposite the first direction.

In an additional aspect, a display assembly can have a frame with a plurality of side portions that cooperate to define a central opening that is configured to receive at least one visual feature. The central opening can have a central axis passing through a center point of the frame. At least one side portion of the frame can comprise (a) a base portion having opposed inner and outer surfaces; and (b) a projection having an arm section that extends outwardly from the outer surface of the base portion and first and second rail sections extending from the arm section in opposite directions that are parallel or substantially parallel to the central axis. The first rail section, the arm section, and the outer surface of the base portion can cooperate to define a first receiving space. The second rail section, the arm section, and the outer surface of the base portion can cooperate to define a second receiving space. Each receiving space can be configured to at least partially receive a portion of a connector that is slidingly inserted into the receiving spaces in a direction perpendicular or substantially perpendicular to the central axis.

In another aspect, described herein are systems for selectively arranging a plurality of visual features that can comprise a plurality of display assemblies. The systems can include connectors for coupling aligned side portions of the frames of adjacent display assemblies.

In another aspect, described herein are methods for selectively arranging a plurality of visual features. In one aspect, the method can comprise positioning a plurality of display assemblies onto a surface.

Additional advantages of the invention will be set forth in part in the description which follows, and in part will be obvious from the description, or may be learned by practice of the invention. In some optional aspects, the advantages of the invention can be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this specification, illustrate several aspects of the invention and together with the description, serve to explain the principles of the invention.

FIG. 1A is a side perspective view of an exemplary side portion of a frame of a display assembly as disclosed herein. FIG. 1B is a perspective view of the side portion of the frame of FIG. 1A, with the projections of the side portion rotated to extend in a downward direction.

FIG. 2 is an isolated perspective view of an exemplary connector having projections that can be selectively inserted within receiving spaces defined by side portions as depicted in FIGS. 1A-1B and as further disclosed herein.

FIG. 3A is an exploded perspective view of an exemplary connector and an exemplary side portion of a frame of a display assembly as disclosed herein, shown prior to insertion of a projection of the connector within a receiving space of the side portion. FIG. 3B is a perspective view of the connector and side portion of the frame after insertion of the projection of the connector within the receiving space of the side portion.

FIG. 4A is a perspective view of the display assemblies and the connector prior to insertion of the projections of the connector within the receiving spaces of aligned side portions of the first and second display assemblies. FIG. 4B is a perspective view of the display assemblies after alignment of adjacent side portions of the first and second display assemblies. FIG. 4C is a perspective view of the display assemblies and the connector after insertion of the projections of the connector within the receiving spaces of aligned side portions of the first and second display assemblies.

FIG. 5A is a perspective view of an alternative connector configuration having first and second handles that bias the projections of the connector to a closed position. FIG. 5B is a perspective view of first and second display assemblies and the connector of FIG. 5A prior to insertion of the projections of the connector within the receiving spaces of aligned side portions of the first and second display assemblies. FIG. 5C is a perspective view of the display assemblies and the connector after insertion of the projections of the connector within the receiving spaces of the aligned side portions of the first and second display assemblies.

FIG. 6A is a perspective view of mount subassembly, a backing, and a frame as disclosed herein. FIG. 6B is a perspective view of an assembled mount subassembly and backing as disclosed herein. FIG. 6C is a perspective view of a fully assembled display assembly having a frame, a backing, and a mount subassembly as disclosed herein.

FIGS. 8A-8B show the same configuration of display assemblies in a vertical orientation and a horizontal orientation, respectively. As shown, it is contemplated that the plurality of display assemblies can be configured to display respective visual features independent of other display assemblies (see FIG. 8B). However, it is also contemplated that the plurality of display assemblies can be configured to cooperatively display respective portions of a single visual work (see FIGS. 8A and 8C-8E). It is still further contemplated that the same display assemblies can be selectively cycled between an "independent operation" mode and a "cooperative operation" mode (compare the display assemblies in FIGS. 8A-8B). As shown, it is still further contemplated that the same core display assembly shape can be used throughout a display system while still permitting changes to the overall appearance of the system through addition or removal of display assemblies (see FIGS. 8C-8E).

FIGS. 9A-9B are end and side perspective views of an exemplary side portion of a frame of a display assembly as disclosed herein.

FIGS. 10A-10B are top and side perspective views of an exemplary connector for use with frames having side portions as depicted in FIGS. 9A-9B.

FIGS. 11A-11B are opposing end perspective views depicting complementary engagement between the projection of a side portion of a frame as depicted in FIGS. 9A-9B and a connector as depicted in FIGS. 10A-10B.

FIG. 12 is a front perspective view of an exemplary frame having side portions as depicted in FIGS. 9A-9B.

FIG. 14A is a bottom perspective view of a portion of an exemplary coupling subassembly as disclosed herein. FIG. 14B is a perspective view of an exemplary display assembly, an exemplary connector, and the coupling subassembly of FIG. 14A prior to frictional engagement of the projection of the coupling subassembly between the connector and the side portion of the frame of the display assembly. FIG. 14C is a perspective view of the display assembly, the connector, and the coupling subassembly following frictional engagement of the projection of the coupling subassembly between the connector and the side portion of the frame of the display assembly.

FIG. 15A is a bottom perspective view of a portion of an exemplary coupling subassembly as disclosed herein. FIG. 15B is a perspective view of an exemplary connector having a plurality of axial slots configured to receive a portion of a respective projection of the coupling subassembly of FIG. 15A. FIG. 15C is a perspective view of the connector of FIG. 15B and the coupling subassembly of FIG. 15A prior to insertion of the projection of the coupling subassembly into an axial slot of the connector. FIG. 15D is a perspective view of the connector of FIG. 15B and the coupling subassembly of FIG. 15A following insertion of the projection of the coupling subassembly into an axial slot of the connector.

DETAILED DESCRIPTION

Figure 4A:
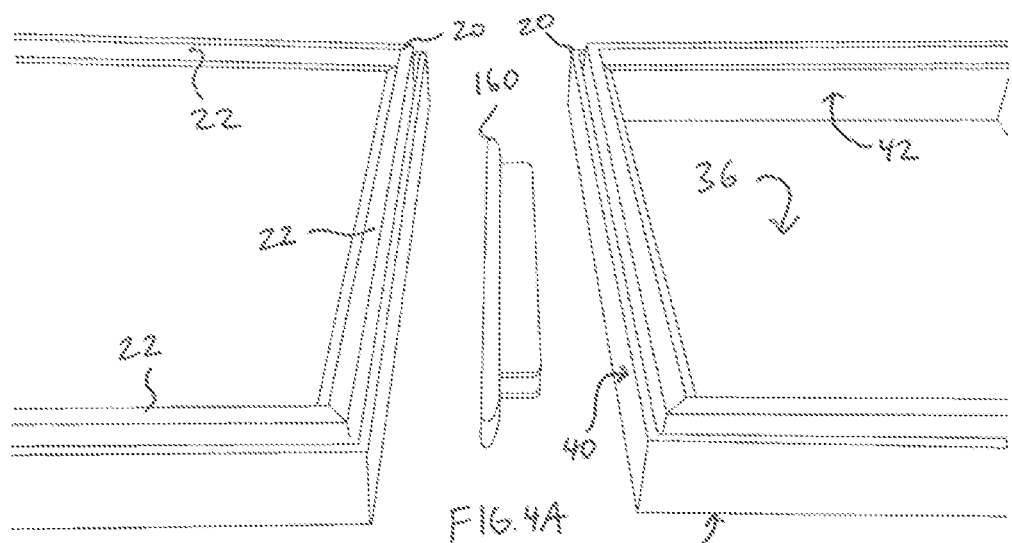
FIGS. 4A-4C sequentially depict the connection of first and second display assemblies using a connector as disclosed herein.
Figure 4B:
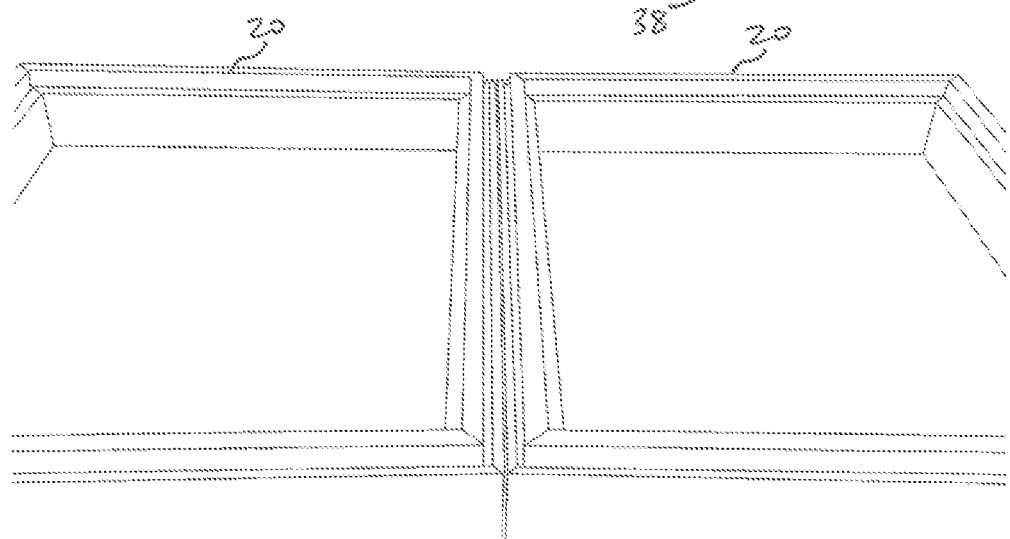
Figure 4C:
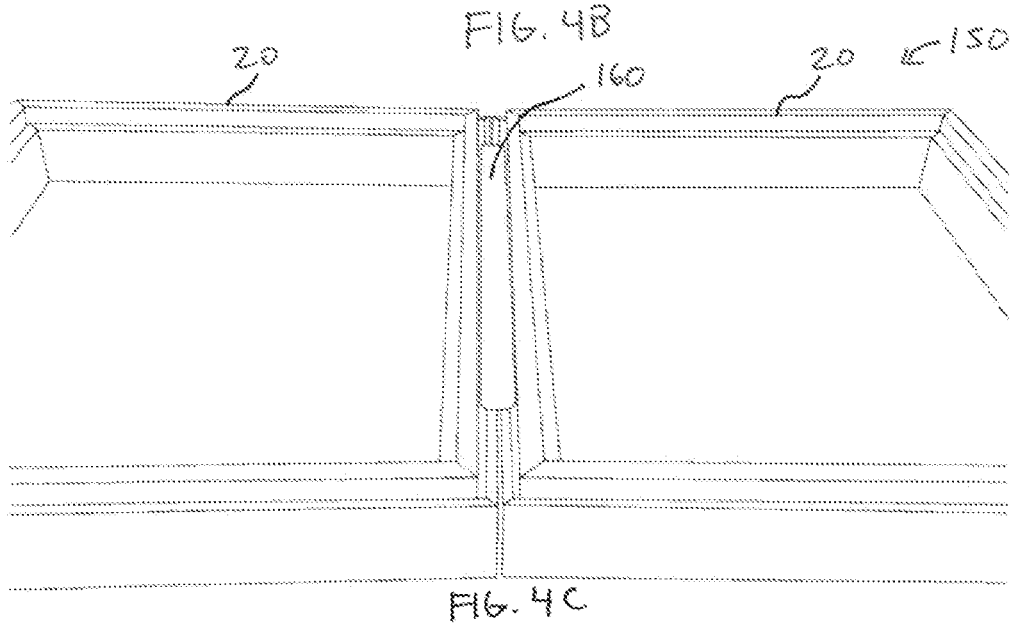

The present invention can be understood more readily by reference to the following detailed description, examples, drawings, and claims, and their previous and following descriptions. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a display assembly" can include two or more such display assemblies unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

As used herein, the term "substantially" means that the described characteristic is within about 15%, about 10%, or about 5% of the specified value. For example, if a surface is "substantially parallel" to a specified orientation axis, then the surface is oriented at an angle that is within about 15%, within about 10%, or within about 5% of being parallel to the specified orientation axis.

The terms "first," "second," "first part," "second part," and the like, as used herein, do not denote any order, quantity, or importance, and are used to distinguish one element from another, unless specifically stated otherwise.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Described herein, in various exemplary embodiments and with reference to FIGS. 1A-19, is a display assembly 10 for displaying one or more visual features. In exemplary aspects, the display assembly 10 can comprise a frame 20. In one aspect, the frame 20 can have an outer edge 40. In another aspect, the frame 20 can have an inner edge 42. In a further aspect, the outer edge 40 of the frame 20 can define a perimeter of the frame 20. In still a further aspect, the inner edge 42 of the frame 20 can define a central opening 36. It is contemplated that the central opening 36 can be configured to receive at least one visual feature of a plurality of visual features. It is contemplated that the at least one visual feature can comprise an image, text (letters, phrases, sentences, paragraphs, and the like), a document, an object, or combinations or portions thereof. The images can be any graphic, such as a piece of artwork (i.e., a painting, a photograph, a sketch, or collage, etc.). For example, in some exemplary aspects, it is contemplated that visual features 22 can be manually positioned within the central openings 20 of frames 12 as further disclosed herein. In other aspects, as further disclosed herein, it is contemplated that at least a portion of the images can be digital or electronic images.

Optionally, in exemplary aspects, it is contemplated that at least one visual feature can be displayed digitally using a video display, such as, for example and without limitation, an electronic paper display, a plastic electronic display, a LCD video display, or an electrowetting display as are known in the art. In one aspect, the video display can be incorporated into the frame 20. In another aspect, the video display can comprise at least a portion of the frame 20. In one aspect, the video display can be flexible. In another aspect, the video display can have a selected cross-sectional profile, such as, for example and without limitation, a concave, a convex, or a substantially planar cross-sectional profile. In another aspect, the video display can have a desired shape, such as, for example and without limitation, a three-dimensional polygonal shape, including, for example and without limitation, a rectangular or triangular shape in at least one plane. One skilled in the art would appreciate that such digital video displays can comprise a programmable memory such that the user can display a slideshow of multiple visual features. The programmable memory can comprise a built-in memory and/or a memory card slot that allows the user to increase the storage capacity. The digital display can show JPEG, BMP, and TIFF images, as well as any other images having a suitable format. Optionally, the digital video display can comprise a built-in speaker allowing the user to play MP3 and WAV audio files. As is known to one skilled in the art, the speaker can be a mono or stereo speaker. Optionally, in exemplary aspects, the digital display can be configured to display video files such as, but not limited to, M-JPEG, WMA, AVI, and MPEG-1, 2, and 4 video files. In one aspect, the digital display can comprise touch-screen controls as are known in the art. In another aspect, the video display can comprise software that allows the user to operate the video display using a computer, a cellular device, a tablet, and/or a remote control device. In operation, it is contemplated that the user can control each respective video display from a remote location. In a further aspect, the video display can provide various playback speeds. In another aspect, the video display can be configured to display selected transition patterns when the video display transitions from displaying a first visual feature to a second visual feature. In yet another aspect, the video display can display random slideshows or, alternatively, the user can create a playlist containing specific images of the user's choice. In another aspect, the digital display can comprise internal memory. In another aspect, the digital display can comprise a USB port and/or a card reader as are known in the art. As is known in the art, a user can connect the video display to a computer, a cellular device, a tablet, a flash drive, an external hard drive, and/or a memory card using the USB port and/or the card reader to transfer image files and/or audio files from the computer, cellular device, flash drive, external hard drive, memory card to the digital display. In another aspect, the digital display can be configured to establish Wi-Fi and/or Bluetooth connectivity with an external device. Such Wi-Fi and/or Bluetooth connectivity allows the user to connect the video display to a network, a computer and/or cellular device in a wireless manner as is known in the art. It is contemplated that the video display can be linked to a user's social media website, such as, but not limited to, Facebook, Twitter, and/or Instagram, such that images and/or videos uploaded to the social media website can appear on the video display.

As shown in FIGS. 4A-7A, the frame 20 of the display assembly 10 can have a front surface and an opposed rear surface 38. In this aspect, the front and back surfaces of the frame 20 can extend between the inner and outer edges 42, 40 of the frame 20 of the display assembly 10.

In one aspect, it is contemplated that the frame 20 of the display assembly 10 can comprise any shape. Such shapes can include rectangular, substantially rectangular, square, substantially square, triangular, substantially triangular, and the like. In another aspect, the frame 20 of the display assembly 10 can be of any size (in any dimension). For example and without limitation, the size of the frame 20 of the display assembly 10 can be 4"×6", 4×7, 4×12, 5×5, 5"×7", 7×7, 8×8, 8"×10", 8.5×11, 8×12, 9×12, 10×13, 10×20, 11"×14", 11"×17", 12"×12", 12"×16", 12"×18", 13"×19", 14"×18", 12"×36", 16"×20", 18"×24", 20"×24", 20"×28", 22"×28", 24"×30", 27"×39", 27"×40", or 27"×41" (all measurements are provided in inches). In yet another aspect, the frame 20 of the display assembly 10 can comprise any color or a combination of colors. In another aspect, the frame 20 of the display assembly 10 can be clear or translucent. In another aspect, the frame 20 of the display assembly 10 can comprise wood, plastic, acrylic, vinyl, fabric, metal, stone, or combinations thereof. Optionally, in some exemplary aspects and as shown in FIGS. 4A-7, the frame 20 can have a stepped configuration in which the frame has an outer frame portion and an inner frame portion that is recessed relative to the outer frame portion such that the inner frame portion has a cross-sectional height that is less than a cross-sectional height of the outer frame portion. In these optional aspects, it is contemplated that the inner frame portion can define the central opening 36.

Display Assemblies Having Frames with First and Second Projections

In exemplary aspects, and with reference to FIGS. 1A-8G, the frame 20 of the display assembly can comprise a plurality of side portions 22 that cooperate to define the central opening 36. In these aspects, at least one side portion 22 (optionally, each side portion) of the frame 20 can comprise: (a) a base portion 24 defining a portion of a rear surface 38 of the frame; and (b) first and second projections 26, 28 extending from the base portion in a first direction away from the rear surface of the frame. It is contemplated that the first and second projections 26, 28 can define a receiving space 30 that extends along a length of the side portion 22. It is further contemplated that the receiving space 30 can be configured to at least partially receive a portion of a connector that is inserted into the receiving space in a second direction opposite the first direction. Thus, in use, and as further described herein, it is contemplated that the connectors disclosed herein can be selectively secured to and removed from side portions of the frame without the need for removing or detaching the display assembly from the structure upon which it rests or is secured (e.g., a wall).

In one aspect, the first projection 26 of the at least one side portion 22 of the frame 20 can define a portion of an outer edge 40 of the frame. In this aspect, the at least one side portion of the frame can have an inner edge portion 32 that defines an inner edge 42 of the frame, and the second projection 28 of the at least one side portion of the frame 20 can be positioned radially between the receiving space 30 and the inner edge portion 32.

In exemplary aspects, the first projection 26 of the at least one side portion 22 of the frame 20 can have a first height relative to the rear surface 38 of the frame, and the second projection 28 of the at least one side portion of the frame can have a second height relative to the rear surface of the frame. In these aspects, it is contemplated that the second height can be greater than the first height.

In further aspects, it is contemplated that the inner edge portion 32 of the at least one side portion 22 of the frame 20 can be recessed from the second projection 28 in the second direction to define a ledge 34. In these aspects, the ledge 34 can have a height relative to the rear surface 38 of the frame 20 that is less than the first height.

In still further aspects, the first and second projections 26, 28 can have respective thicknesses. Optionally, in these aspects, the thickness of the first projection 26 can be less than the thickness of the second projection 28.

Optionally, in exemplary aspects, the first and second projections 26, 28 and the inner edge portion 32 of the at least one side portion 22 of the frame 20 can be integrally formed as a unitary, monolithic structure.

Optionally, in further exemplary aspects, the first and second projections 26, 28 and the receiving space 30 can extend circumferentially and contiguously around the central opening 36 of the frame 20.

In one optional aspect, the plurality of side portions 22 can comprise at least three side portions (optionally consisting of three side portions). In another optional aspect, the plurality of side portions can comprise at least four side portions (optionally consisting of four side portions).

Referring now to FIGS. 6A-7B, in one optional aspect, the display assembly 10 can comprise a backing 50. The backing 50 can have a front wall 52 and an opposed back wall 54 that defines a rear surface 56. It is contemplated that at least a portion of the backing 50 can be configured for selective operative coupling to the frame 20 of a respective display assembly. Optionally, in exemplary aspects, the inner edge 42 of the frame can define at least one slit or indentation that is configured to receive a portion of the backing 50 to thereby support the backing in an operative position. Alternatively, in one exemplary aspect, the inner edge 42 of the frame 20 can define a lip or protrusion that can extend inwardly from the inner edge toward the central opening 36 to support the backing 50 in an operative position and help prevent the backing from extending through the central opening of the frame. Upon operative coupling of the backing 50 to the frame 20 of the display assembly 10, it is contemplated that at least a portion of the backing 50 can be positioned in communication with (optionally, within) the central opening 36.

In various aspects, and as shown in FIGS. 6A-7B, the system 150 for displaying visual features disclosed herein can comprise at least one support member. It is contemplated that the at least one support member can be configured to support the display assembly 10 in an operative position relative to a selected surface. Optionally, the at least one support member can be configured to secure the display assembly 10 to the selected surface. Optionally, the at least one support member can comprise a strut back, a stand, a metal tab, a hole, a bracket, a wire, a cleat, a plaque with at least one magnetic attachment point, or combinations thereof. In use, the at least one support member can be secured to a wall surface where display assemblies are to be positioned. After the at least one support member is secured to the wall surface, a first display assembly can be selectively positioned in engagement with the at least one support member, and then additional display assemblies can be coupled to the first display assembly as further disclosed herein. Optionally, in use, it is contemplated that the cover, visual features such as photographs, for example and without limitation, other display elements, and the backing need not be inserted into the display assembly until the display assembly is properly engaged by the support member, thereby permitting visibility of the support member during the initial positioning of the display assembly. After proper positioning of the first display assembly is confirmed, then the cover, visual features, display elements and backing can be installed within the frame of the first display assembly such that the support member is no longer visible. Alternatively, in use, it is contemplated that the cover, visual features such as photographs, for example and without limitation, other display elements, and backing can be inserted into the display assembly prior to engagement of the display assembly by the support member. Prior to proper positioning of the first display assembly, the cover, visual features, display elements, and backing can be installed within the frame of the first display assembly, and then the first display assembly can be properly positioned in engagement with the at least one support member.

In exemplary aspects, the backing 50 can have a central opening 58, and the at least one support member can comprise a mount subassembly 80 having: (a) a base plate 82 defining a slot 84 positioned in alignment with the central opening 58 of the backing; (b) a bolt 88 having a threaded shaft portion 90 configured to be received through the slot of the base plate and the central opening of the backing; and (c) a nut 92 configured for threaded engagement with a distal end 91 of the threaded shaft portion of the bolt to secure the base plate against a rear surface of the backing. It is contemplated that, with the nut 92 detached from the bolt 88, the display assembly 10 can be selectively and freely rotated about the bolt (in 360 degrees) to thereby adjust the angular tilt or orientation of the display assembly (and any other display assembly connected to the display assembly as further disclosed herein) without the need for disconnecting the mount subassembly 80 from a wall or other surface. For example, it is contemplated that the display assembly 10 can be adjusted from a vertical orientation to a horizontal orientation (or from a horizontal orientation to a vertical orientation) without the need for removing the display assembly from the mount subassembly 80. Optionally, in these aspects, the slot 84 of the base plate 82 can have a length (e.g., horizontal) dimension that extends beyond the central opening 58 of the backing 50 to permit selective adjustment of the position (e.g., horizontal position) of the backing (and display assembly) relative to the base plate without the need for re-positioning the mount subassembly 80. Additionally, when a display system comprises multiple mount subassemblies, it is contemplated that the slot of the base plate of a first mount assembly can permit adjustment of the space between other display assemblies (or display systems) that are supported by a different mount assembly. Optionally, in further aspects, the mount subassembly 80 can further comprise a rubber gasket 94 having a slot 96 that is positioned in alignment with the slot 84 of the base plate 82 and configured for positioning between the base plate and the backing 50 to permit receipt of the threaded shaft portion 90 of the bolt 88 through the base plate, the rubber gasket, and the backing.

In further exemplary aspects, the frame 20 can comprise at least one alignment feature 44 extending inwardly from at least one side portion 22 of the frame. In these aspects, the at least one alignment feature 44 can define an alignment opening 46. In additional aspects, the backing 50 can define at least one peripheral opening 60, and each peripheral opening of the backing can be configured to be positioned in alignment with a corresponding alignment opening 46 of the at least one alignment feature 44.

Optionally, in further aspects, the at least one alignment feature 44 can comprise opposed first and second alignment features, and each of the first and second alignment features can define a respective alignment opening 46. Optionally, in these aspects, the at least one peripheral opening 60 of the backing 50 can comprise opposed first and second peripheral openings.

In additional aspects, the display assembly 10 can further comprise at least one peripheral fastener 100 and at least one peripheral nut 104. In these aspects, each peripheral fastener 100 can be configured for receipt through a corresponding peripheral opening 60 of the backing 50 and a corresponding alignment opening 46 of the at least one alignment feature 44. The at least one peripheral nut 104 can be configured for threaded engagement with a distal end 102 of a corresponding peripheral fastener 100 of the at least one peripheral fastener.

Optionally, in further aspects, and with reference to FIGS. 6A-7B, the at least one peripheral opening 60 of the backing 50 can comprise opposed first and second alignment slots 62 that permit adjustment of the position of a respective peripheral fastener 100 relative to a length of the corresponding alignment slot. Optionally, in these aspects, the first and second alignment features 44 of the frame 20 can extend from the inner surface of the frame along a first axis 48, and the first and second alignment slots 62 can be oriented parallel or substantially parallel to the first axis. The alignment opening 46 of each of the first and second alignment features 44 can comprise an elongate slot that is in alignment with the first and second alignment slots 62, respectively.

Figure 7A:
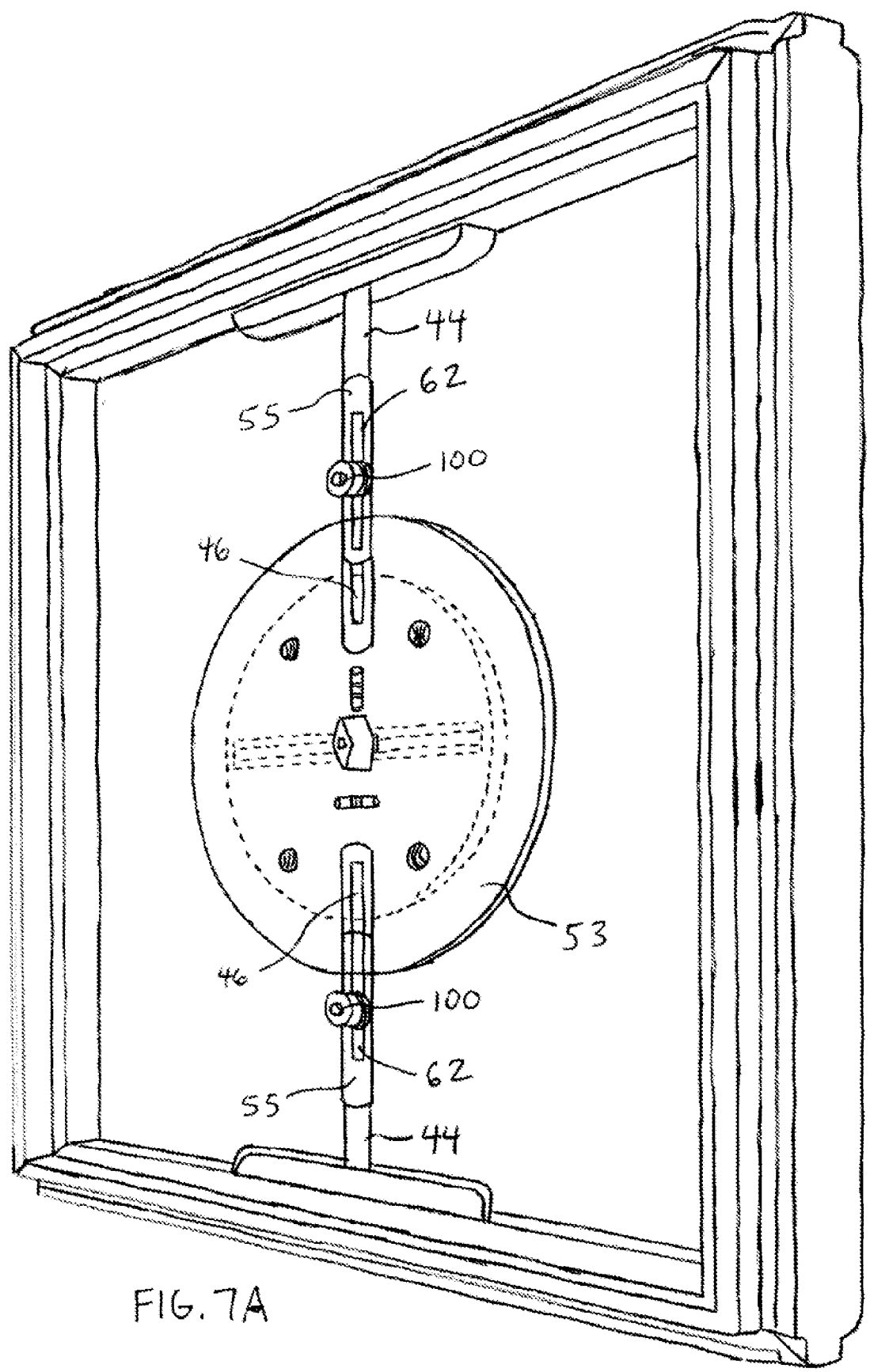
FIG. 7A is a front perspective view of an exemplary display assembly having a track system that permits adjustment of the horizontal, vertical, and rotational positions of the display assembly relative to a surface (e.g., a wall), while also permitting adjustment to fit various frame sizes.
Figure 7B:
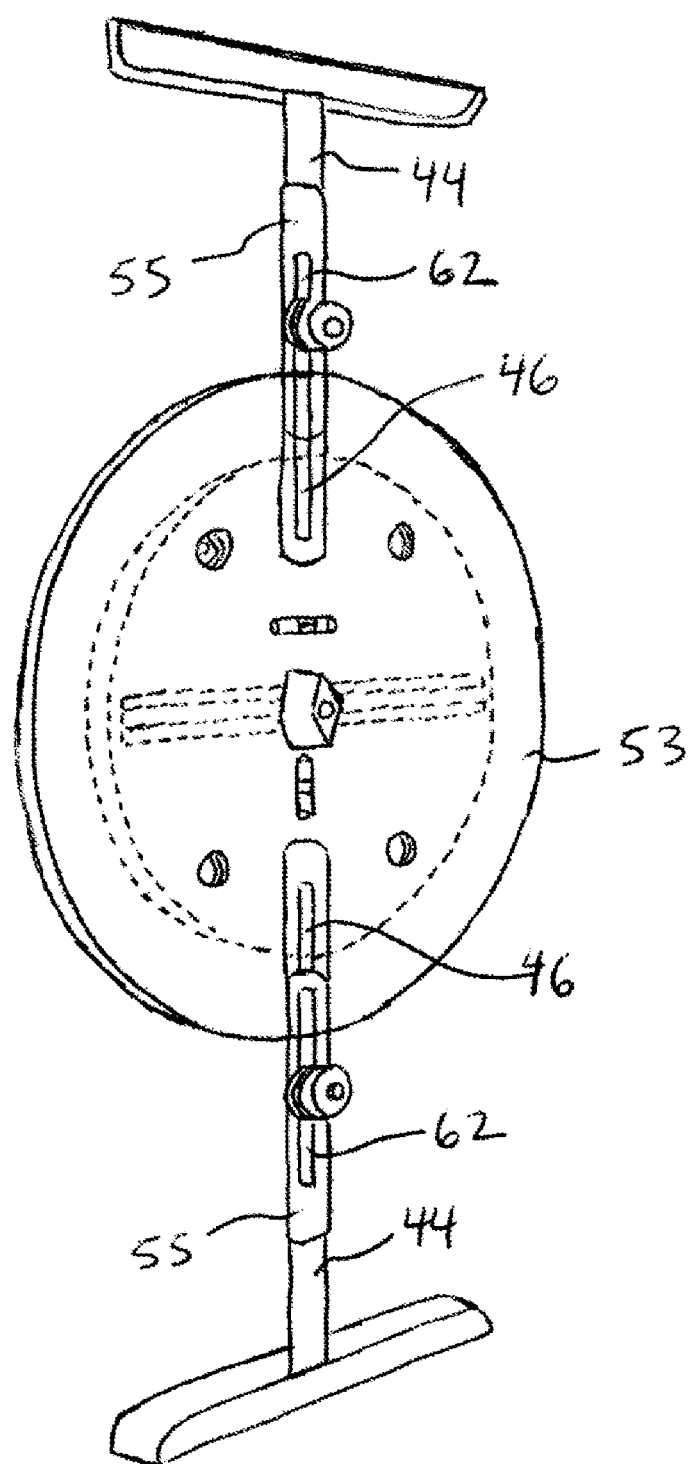
FIG. 7B is an isolated perspective view of a base portion of a backing and aligned alignment slots that cooperate to permit vertical adjustment of the effective size of the mounting subassembly as further disclosed herein.
Figure 8A:
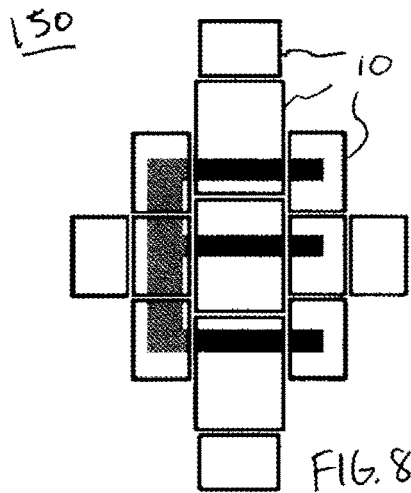
FIGS. 8A-8G depict various exemplary configurations of systems comprising a plurality of display assemblies as disclosed herein.
Figure 8B:
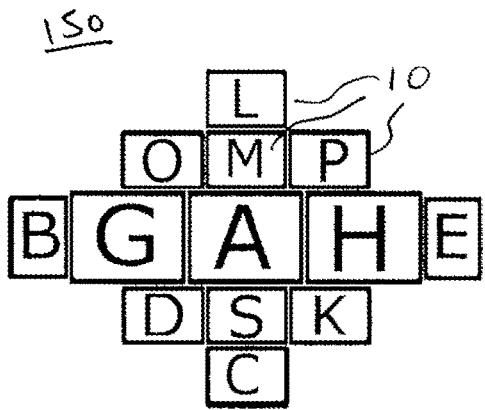
Figure 8C:
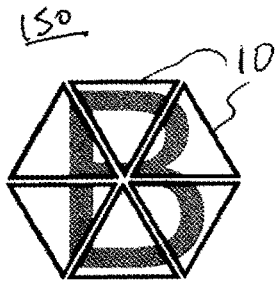
Figure 8D:
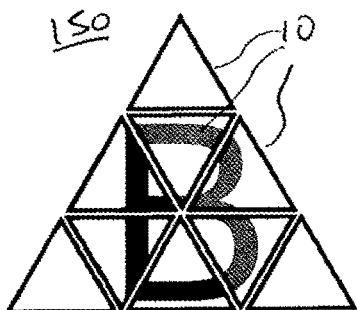
Figure 8E:
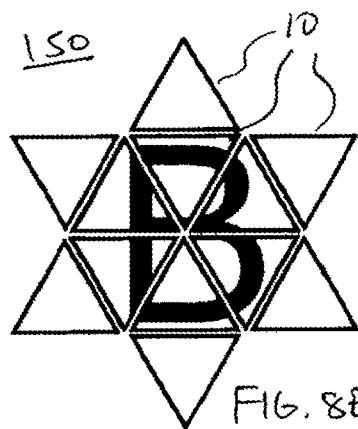
Figure 8F:
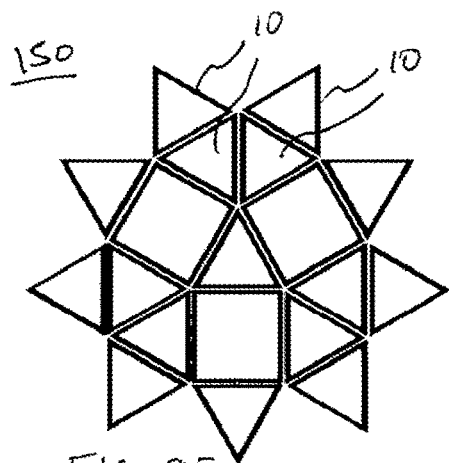
Figure 8G:
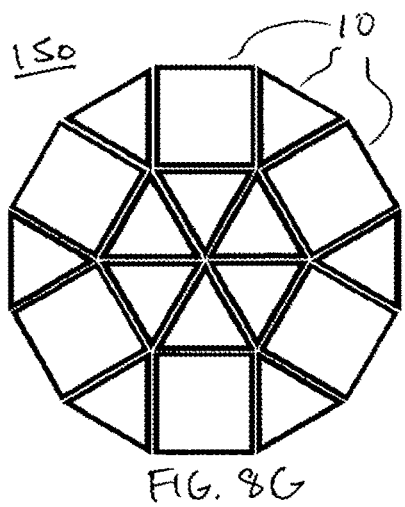
Figure 13A:
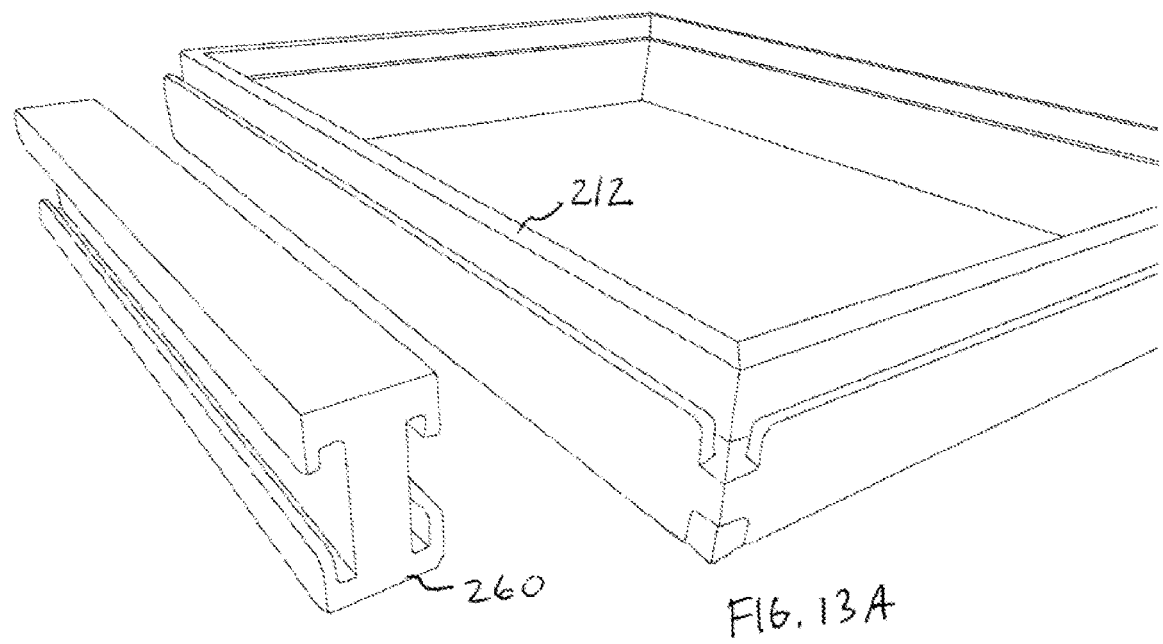
FIGS. 13A-13D depict the sequential engagement between a connector of FIGS. 10A-10B and respective aligned side portions of the adjacent frames as depicted in FIG. 12.
Figure 13B:
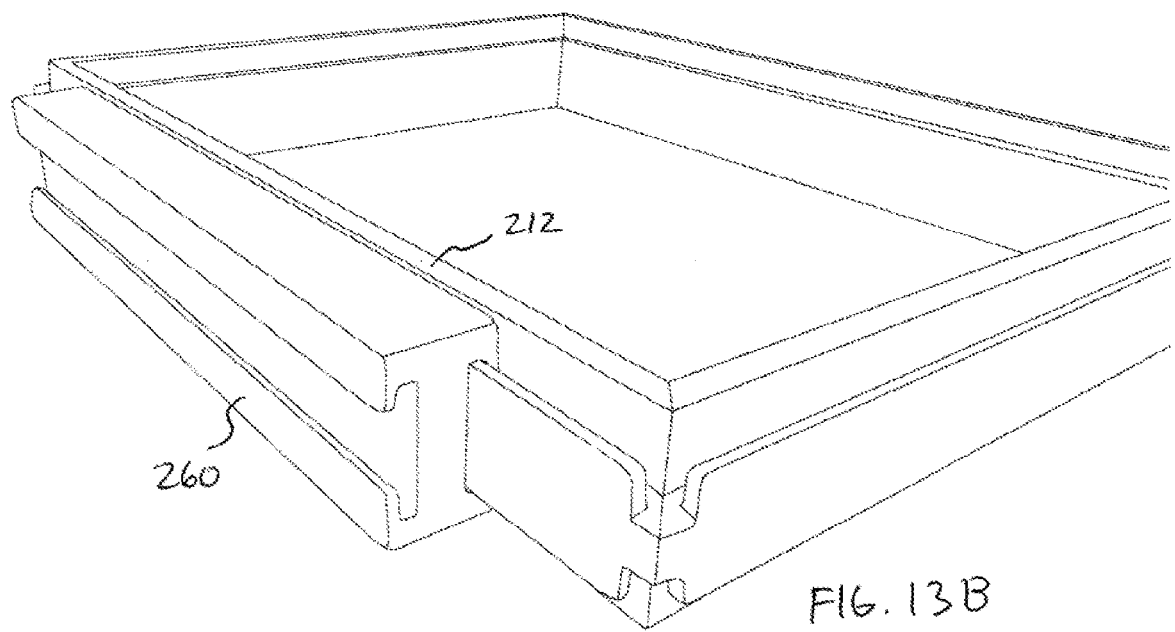
Figure 13C:
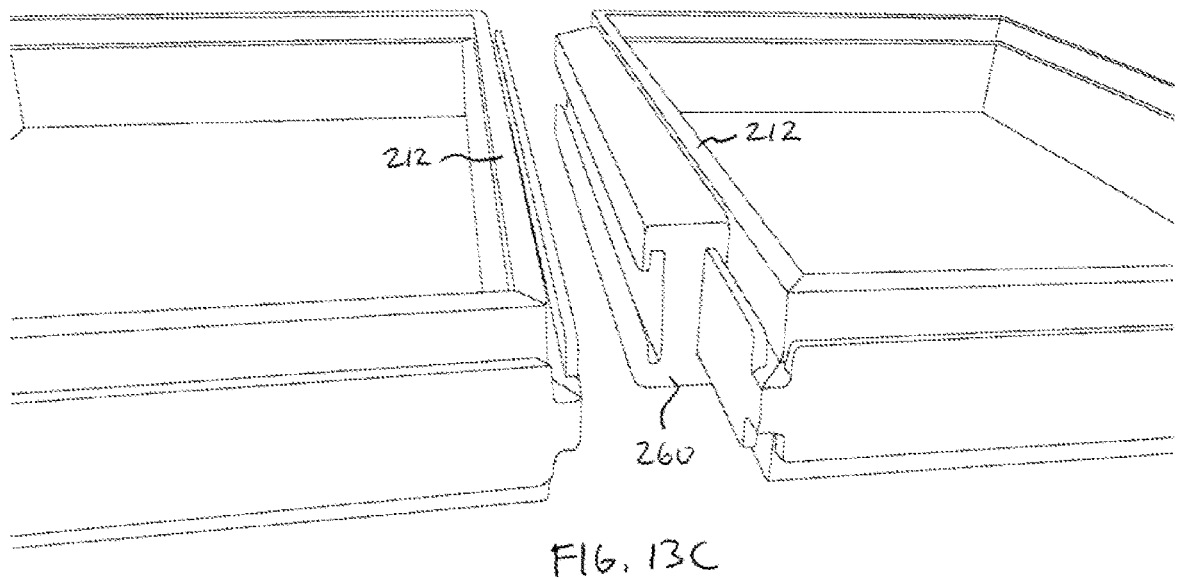
Figure 13D:
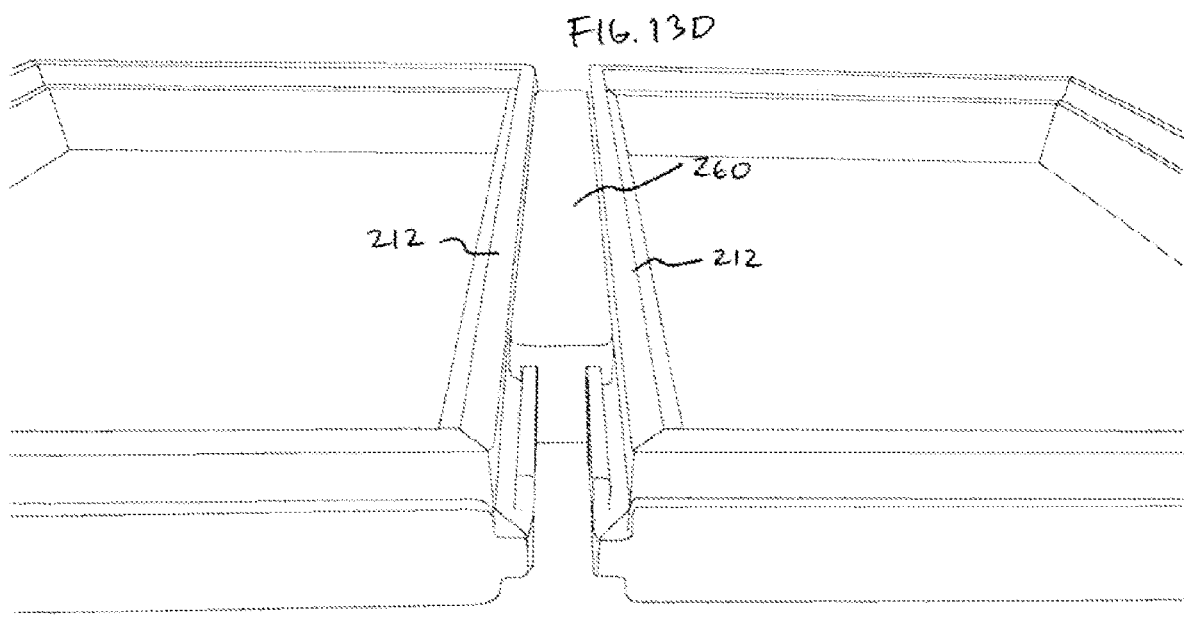

Optionally, in further aspects, the backing 50 can be selectively expandable or retractable relative to the first axis 48. In these aspects, and as shown in FIGS. 7A-7B, it is contemplated that the backing 50 can comprise at least one extension portion 55 that is slidably coupled to a base portion 53 of the backing to permit movement of the extension portion along the first axis. It is further contemplated that the base portion 53 and the extension portion 55 of the backing can define respective slot portions that cooperate to form at least one of the first and second alignment slots 62 of the backing. Optionally, the at least one extension portion 55 can comprise two extension portions positioned on opposite ends of the base portion 53.

In further optional aspects, rather than comprising an extension portion, the base portion 53 of the backing can have slot portions that define respective alignment slots 62 of the backing and project outwardly from the base portion. In these aspects, it is contemplated that the first and second alignment slots 46 defined by the first and second alignment features 44 of the frame can be aligned with the alignment slots 62 of the slot portions of the base portion of the backing.

In use, it is contemplated that at least one peripheral fastener 100 can be selectively loosened or removed to permit axial movement of the frame relative to the backing and mount subassembly. More particularly, the slots defined by the first and second alignment features 44 of the frame can permit axial movement of the frame relative to the backing and the mount subassembly, and the previously loosened or removed peripheral fastener 100 can be tightened after a desired vertical position of the frame is reached.

Additionally, or alternatively, when the backing 50 comprises at least one extension portion 55, it is contemplated that the at least one extension portion can translate axially relative to the base portion 53 to thereby permit selective adjustment of the profile of the backing structure. Such adjustment can be useful, for example, to accommodate frames of different sizes.

In other exemplary aspects, the base plate 82 can define at least one attachment opening 86 spaced outwardly from the slot 84 of the base plate. In these aspects, the display assembly 10 can further comprise at least one attachment fastener (not shown) configured for receipt through the at least one attachment opening 86 of the base plate 82 to secure the display assembly to the selected surface. In additional aspects, the rubber gasket 94 can define at least one attachment opening 97 positioned for alignment with a corresponding attachment opening 86 of the base plate 82. In further aspects, the backing can define at least one attachment opening positioned for alignment with a corresponding attachment opening of the base plate. However, in these aspects, it is understood that the backing need not be secured to the base plate using attachment fasteners.

Optionally, as further depicted in FIGS. 6A-7B, it is contemplated that the backing 50 can comprise a leveling tool assembly for level placement of the display assembly 10 onto a selected surface. In an exemplary aspect, the leveling tool assembly can comprise at least one level vial (e.g., a level bubble vial) 74, 76 configured for selective coupling to the at least one support member. It is contemplated that the at least one level vial can be any conventional level vial known in the art. Optionally, the at least one level vial can comprise first and second leveling vials 74, 76 that are oriented perpendicular to each other to permit use of the leveling tool assembly regardless of the horizontal or vertical orientation of the frame and backing. In a further exemplary aspect, the at least one leveling tool can be rigidly secured to the front wall 52 of the backing to permit viewing of the leveling tools as further disclosed herein. In these aspects, it is contemplated that the at least one leveling tool can be rigidly secured to the backing using a mount or other conventional fastener. Alternatively, it is contemplated that the at least one leveling tool can be selectively detachable from the backing. Although certain exemplary mechanisms for securing the at least one leveling tool to the backing are disclosed above, it is contemplated that any conventional support or engagement mechanism, such as shelves, frictional engagement, adhesive, hook-and-loop fasteners, and the like can be used. In use, it is contemplated that the leveling tool assembly can allow for confirmation of proper orientation of the backing and frame before visual features are inserted into the frame, thereby ensuring that the first display assembly secured to the support member and all display assemblies coupled to the first display assembly are also properly oriented.

In use, it is contemplated that the mount subassembly can anchor the frame of a display assembly to a selected surface (e.g., a wall). As further disclosed herein, even after the mount subassembly is secured to the selected surface, the position of the mount assembly can still be adjusted. First, it is contemplated that the horizontal orientation of the mount assembly (and thus, the display assembly) can be fine-tuned before being locked into place. This feature avoids the frustrations associated with constant re-leveling of conventional frames. Additionally, this feature provides the flexibility needed to account for the geometric deficiencies of rooms (e.g., rooms/ceilings that are not truly square or rectangular) by allowing display assemblies to be mounted at orientations that look level even though they are not truly "level." Overall, the disclosed mount assembly permits selective reconsideration and fine-tuning of the horizontal orientation of the display assembly until a user determines the orientation that works best for a particular room and application.

Second, as further disclosed herein, the physical position of the mount subassembly can be adjusted up/down (vertically) and left/right (horizontally) on the selected surface (e.g., a wall), after the mount subassembly has been secured. Importantly, this capability can allow users to make use of vertical and/or horizontal positions that provide an improved aesthetic look even though the display assembly is not truly centered on the selected surface (e.g., wall). For example, the exact center point between a doorway and a corner of a room does not provide the best aesthetic appearance.

Further, it is contemplated that, depending upon furniture positioning nearby and other factors, a particular display assembly may look better when moved horizontally (left/right) or vertically (up/down). As further disclosed herein, it is contemplated that the described display assemblies can permit these types of adjustments without the need for putting a new nail/screw hole in a wall or other supporting surface. Thus, the disclosed display assemblies provide an interactive display solution that easily and quickly tolerates adjustment to the orientation of the displays without the need for further damage to the wall or other supporting surface.

Figure 17A:
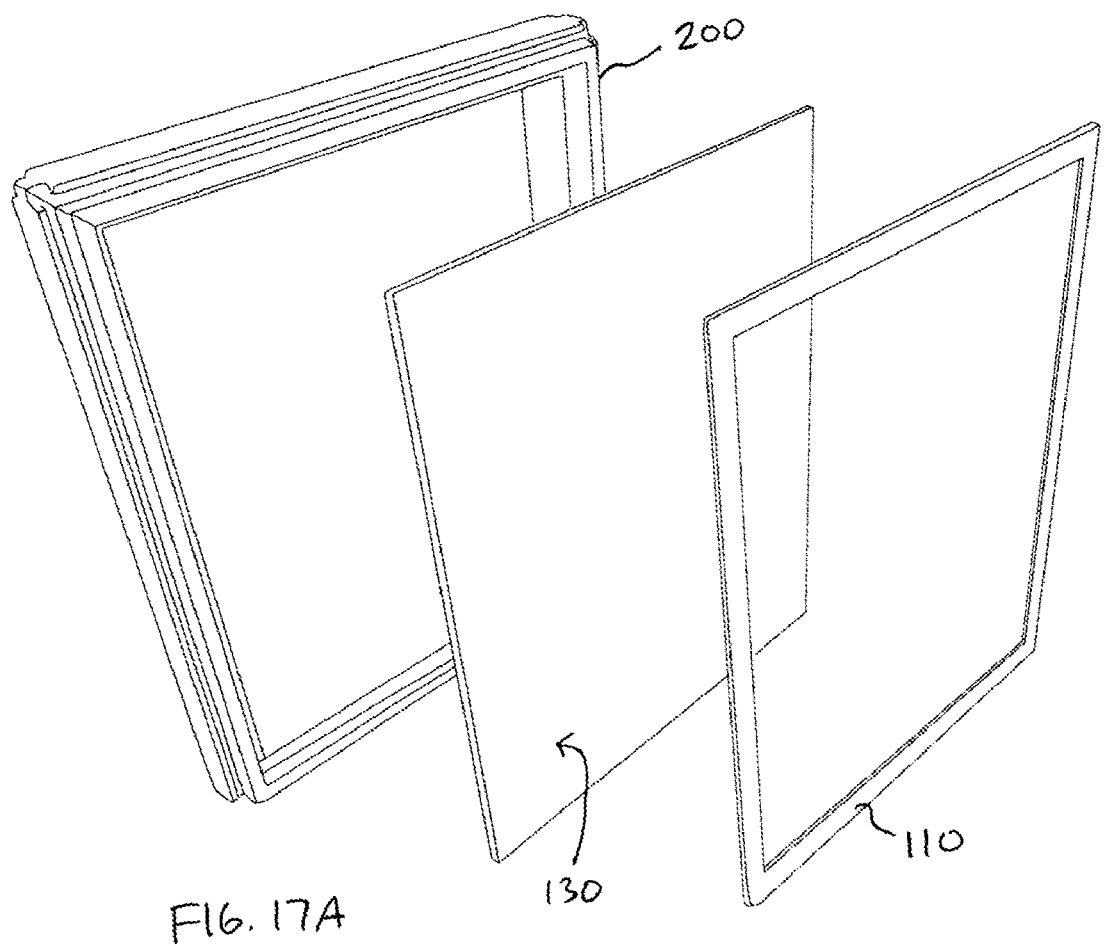
FIG. 17A is an exploded perspective view of an exemplary display assembly having a frame, a display surface, and a cover as disclosed herein.
Figure 17B:
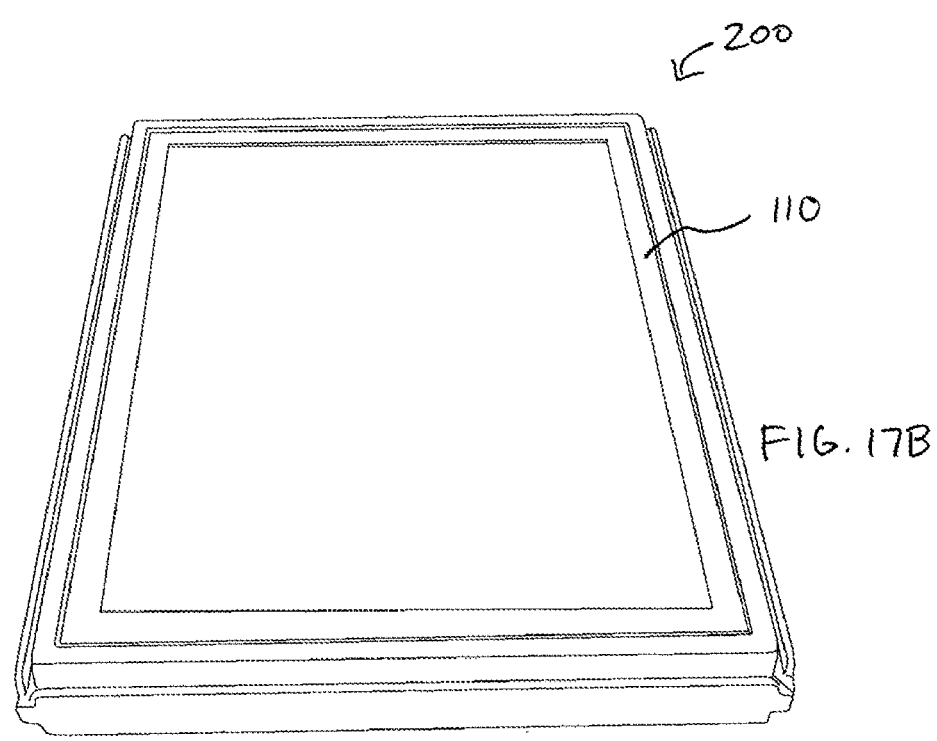
FIG. 17B is a front perspective view of the assembled display assembly.
Figure 18A:
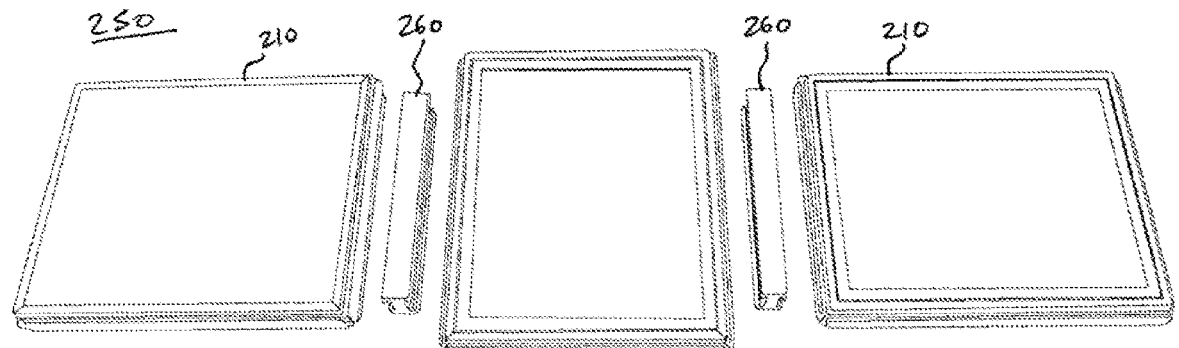
FIGS. 18A-18C are front perspective views depicting the sequential assembly of a display system having a plurality of display assemblies that are connected together by a plurality of connectors as disclosed herein.
Figure 18B:
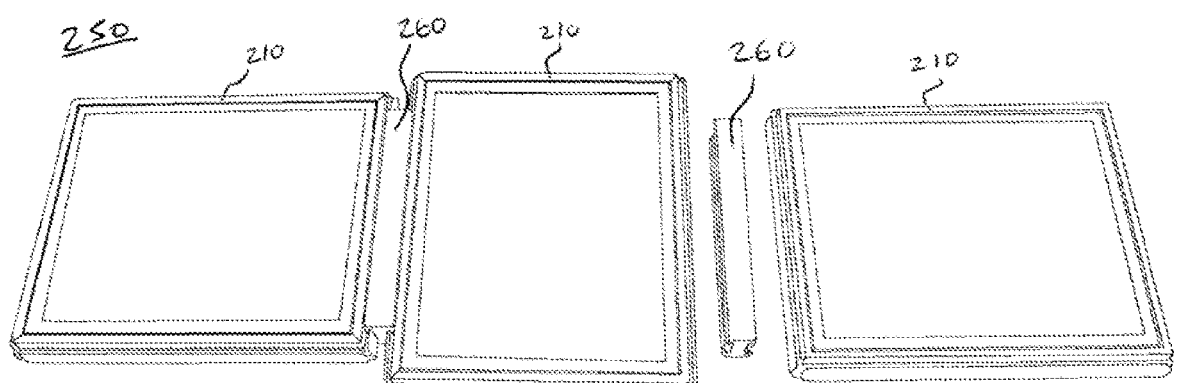
Figure 18C:
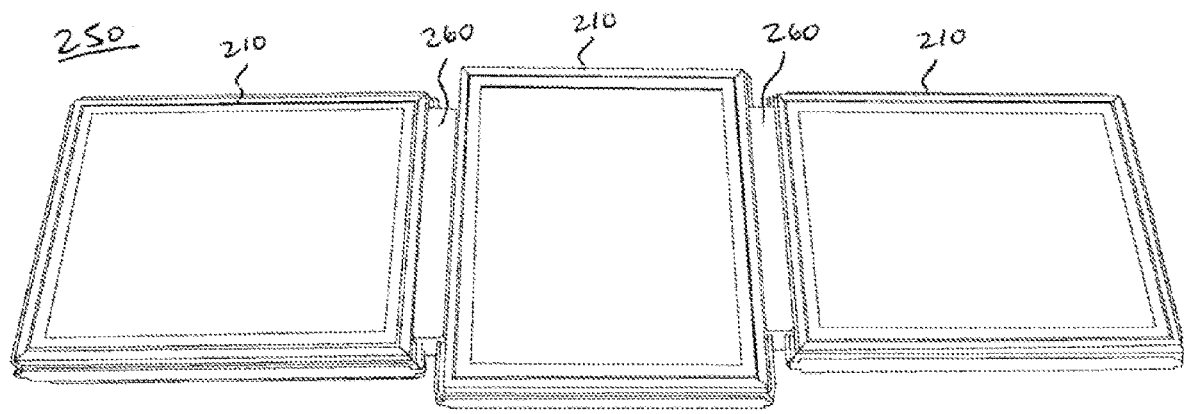
Figure 19:
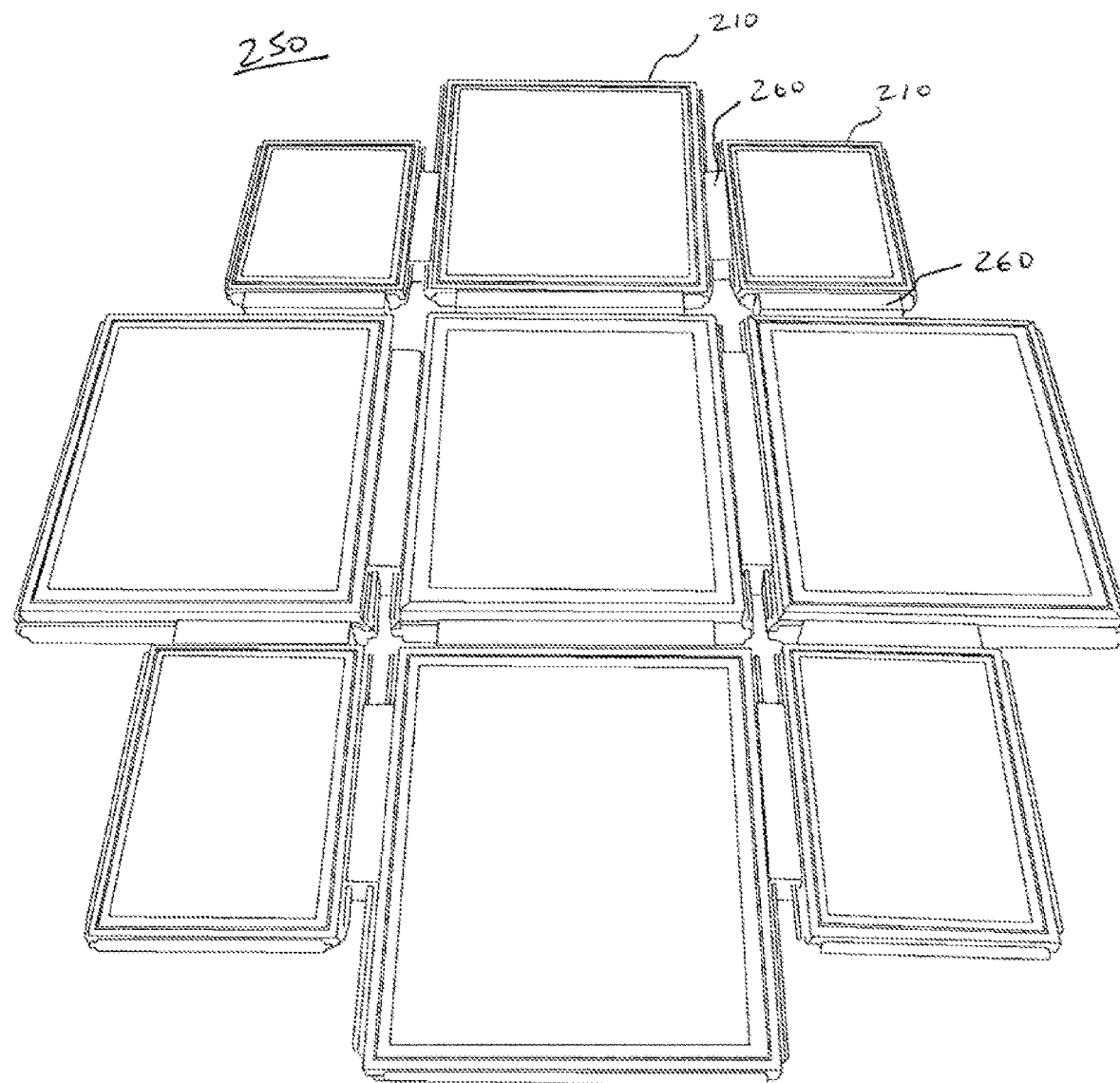
FIG. 19 is a front perspective view of an exemplary display system having a plurality of display assemblies that are secured together using a plurality of connectors as disclosed herein.

Optionally, in another aspect and as shown in FIG. 17A, the display assembly 10 can comprise a cover 110. In one aspect, the cover can extend over at least a portion of the central opening 36 of the frame 20 of the display assembly 10. In another aspect, the cover 110 can be substantially transparent. In another aspect, the cover 110 can comprise plastic, glass, an acrylic material, acetate, or combinations thereof. It is contemplated that the cover can be configured to permit viewing of the at least one visual feature through the cover.

In another exemplary aspect, the display assembly 10 can comprise at least one display surface 130. In one aspect, the at least one display surface 130 can be configured for positioning in communication with (optionally, within) the central opening 36 of the frame 20. It is contemplated that the at least one display surface 130 can be configured to display at least one visual feature of the plurality of visual features. Optionally, in exemplary aspects, the at least one display surface 130 can be operatively associated with a reinforcement material that has a rear surface configured to rest on the ledge of the frame and a front surface configured to support at least one visual feature of the plurality of visual features within the central opening of the frame. In some aspects, the front surface of the reinforcement material can comprise a canvas, a chalkboard, a cork board, a bulletin board, a whiteboard, a magnetic board, drawing paper, or combinations thereof. Alternatively, in other aspects, at least one display surface can be secured to the front surface of the reinforcement material, and the least one display surface can comprise a canvas, a chalkboard, a cork board, a bulletin board, a whiteboard, a magnetic board, drawing paper, an electronic display panel, or combinations thereof. Optionally, in exemplary aspects, the at least one display surface can comprise an electronic display panel selected from the group consisting of an liquid crystal display (LCD) screen, a light emitting diode (LED) screen, an electroluminescent display (ELD) screen, a plasma display panel (PDP) screen, a digital light processing (DLP) screen, electronic paper, or combinations thereof.

In another aspect, the display assembly 10 can comprise at least one light source (not shown) configured to illuminate the at least one visual feature. In one aspect, the at least one light source can be disposed on at least a portion of the frame 20. In another aspect, the at least one light source can be positioned inside a light fixture. In this aspect, at least a portion of the light fixture can be configured to connect to at least a portion of the frame 20. In another aspect, the display assembly 10 can comprise a light box. It is contemplated that the light box can be an LED light box, a backlit light box or any other light box that is known in the art. It is further contemplated that the display assembly 10 can comprise a programmable circuit board disposed within at least a portion of the central opening 36. In another aspect, the display assembly 10 can comprise a stepper motor that can be connected to the circuit board. In this aspect, the circuit board can be used to control the stepper motor. For example, an Arduino circuit board, as is known in the art, can be used to control the stepper motor. It is contemplated that the circuit board can be programmed to control the brightness and color of the lights of the at least one light source. It is further contemplated that the circuit board can be programmed to turn the lights on and off.

In another aspect, it is contemplated that the circuit boards or other processing circuitry can be programmed to communicate (optionally, wirelessly communicate) with a computer or a remote computing device (e.g., a smartphone, PDA, tablet, and the like) such that a user can change the at least one visual feature to another at least one visual feature from a remote location. In this aspect, it is further contemplated that the disclosed system can comprise at least one wireless transmitter/receiver communicatively coupled with the processing circuitry to permit communication with the computer or remote computing device of the user. In yet another aspect, it is contemplated that the processing circuitry can be programmable or otherwise configured to: alter the arrangements of visual features displayed on a plurality of display assemblies; alter a display mode of selected groups of display assemblies (for example, from a first mode in which each display assembly displays a respective visual feature to a second mode in which each display assembly cooperates with other display assemblies to form a single visual feature); sequentially and cyclically display a sequence of visual features on one or more display assemblies; selectively adjust the light output (color, duration, etc.) of the light sources of one or more selected display assemblies, and the like.

In still a further aspect, it is contemplated that the processing circuitry can comprise a microcontroller that is preprogrammed with desired parameters for operation of the system such that input from a user is not required to initiate changes in display characteristics of the system.

Display Assemblies Having a Single Projection with Opposed Rail Portions

In exemplary aspects, and with reference to FIGS. 9A-9BA, 11A-14C, and 17A-19, a display assembly 200 with a frame 210 having an alternative side portion profile can be provided. In these aspects, the frame 210 can have a plurality of side portions 212 that cooperate to define a central opening 240 that is configured to receive at least one visual feature. The central opening 240 can have a central axis 242 passing through a center point 244 of the frame 210. In additional aspects, at least one side portion 212 (optionally, each side portion) of the frame 210 can comprise: (a) a base portion 214 having opposed inner and outer surfaces 216, 218; and (b) a projection 220 having an arm section 222 that extends outwardly from the outer surface of the base portion and first and second rail sections 224, 226 extending from the arm section in opposite directions that are parallel or substantially parallel to the central axis. In these aspects, the first rail section 224, the arm section 222, and the outer surface 218 of the base portion 214 can cooperate to define a first receiving space 228, and the second rail section 226, the arm section, and the outer surface of the base portion can cooperate to define a second receiving space 230. In use, each receiving space 228, 230 can be configured to at least partially receive a portion of a connector that is slidingly inserted into the receiving spaces in a direction perpendicular or substantially perpendicular to the central axis.

In further aspects, the inner surface 216 of the base portion 214 of each side portion 212 of the at least one side portion can define a ledge 232 that is recessed from a front surface of the frame 210.

In still further aspects, the first and second rail sections 224, 226 do not extend along an entire length of the projection 220 of the side portion 212 of the at least one side portion of the frame 210. In these aspects, it is contemplated that the first and second rail sections 224, 226 can taper and/or terminate proximate opposing ends of the side portion 212 (where the side portion adjoins other side portions), thereby providing additional clearance for engagement with a connector as disclosed herein.

Except as otherwise indicated, it is contemplated that the display assembly 200 can have the same features and components disclosed above with respect to display assembly 10.

Display Systems and Methods

In use, and as further disclosed herein, the display assemblies 10, 200 can be configured for selective positioning relative to at least one other display assembly 10.

In exemplary aspects, and with reference to FIGS. 2-8G and 10A-19, the display assemblies 10, 200 disclosed herein can be used in a system 150, 250 for selectively arranging a plurality of visual features. In one aspect, the system 150, 250 can comprise a plurality of display assemblies 10, 200. In one aspect, it is contemplated that the frame 20, 210 of at least one display assembly 10, 200 of the plurality of display assemblies can have a different shape than the frame 20, 210 of at least one other display assembly of the plurality of display assemblies, as depicted in FIGS. 8F and 8G and FIGS. 18A-19. In another aspect, the frame 20, 210 of at least one display assembly 10, 200 of the plurality of display assemblies can have a different size (in at least one dimension) than the frame 20, 210 of at least one other display assembly of the plurality of display assemblies, as shown in FIGS. 8A-8B and FIGS. 18A-19. In yet another aspect, the frame 20, 210 of each display assembly 10, 200 of the plurality of display assemblies can comprise a different color than the frame 20, 210 of at least one other display assembly of the plurality of display assemblies. It is contemplated that the frame 20, 210 of at least one display assembly 10, 200 can be clear or translucent. In still a further aspect, the frame 20, 210 of each display assembly 10, 200 of the plurality of display assemblies can comprise a different material than the frame 20, 210 of at least one other display assembly of the plurality of display assemblies. Alternatively, the frame 20, 210 of each display assembly 10, 200 of the plurality of display assemblies can comprise the same material. It is contemplated that the frame 20, 210 of each display assembly 10, 200 of the plurality of display assemblies can comprise wood, plastic, acrylic material, vinyl, fabric, metal, stone, or combinations thereof. In use, it is contemplated that at least a first display assembly of the plurality of display assemblies is configured to be secured to a selected surface.

Optionally, in exemplary aspects, the outer surfaces of the frames of display assemblies 10, 200 of the display systems 150, 250 disclosed herein can be selectively provided with one or more surface treatments to vary the texture of connecting surfaces within the system. In various aspects, the surface treatments can be configured to increase the strength of attachment and/or fixation of each frame relative to adjacent frames of the system. For example, in one aspect, at least a portion of an outer surface of the frame of one display assembly can have a rubberized or roughened texture that increases the frictional engagement with an adjacent surface of the frame of a second display assembly. In this aspect, it is contemplated that the increased frictional engagement between the adjacent frames can make it more difficult (require more force) to move the frames relative to one another. In exemplary aspects, corresponding outer surfaces of the frames of a plurality of adjacent display assemblies within a system can be provided with similar surface treatments to increase frictional engagement throughout the display system.

In use, the display assemblies and systems disclosed herein can be used in a method for selectively arranging a plurality of visual features. In various aspects, the method can comprise positioning a plurality of display assemblies onto a surface. In one aspect, it is contemplated that the surface can be a horizontal surface. Alternatively, in another aspect, it is contemplated that the surface can be a vertical surface. In other aspects, the method can comprise selectively arranging each display assembly 10, 200 of the plurality of display assemblies relative to at least one other display assembly. It is contemplated that each display assembly 10, 200 of the plurality of display assemblies can be configured for selective positioning relative to at least one other display assembly of the plurality of display assemblies to align adjacent side portions of the frames of the display assemblies to permit connection between the display assemblies as further disclosed herein.

In further exemplary aspects, it is contemplated that a display system can be formed with a plurality of display assemblies having digital displays as further disclosed herein. In these aspects, it is contemplated that the digital displays of the plurality of display assemblies can cooperate to produce a desired visual effect. For example, it is contemplated that each respective digital display can be configured to display a portion of an image, with the digital displays cooperating to display the entire image. Thus, it is further contemplated that the display assemblies can be selectively positioned relative to one another to ensure that the digital displays are properly oriented relative to one another to achieve the desired visual effect. It is still further contemplated that the timing of the display of visual features on each digital display can be coordinated with the timing of the display of visual features on other digital displays of the display system to achieve the desired visual effect. For example, a digital display of a first display assembly can be configured to transition from displaying a first image to displaying a second image at a selected time, and a digital display of a second display assembly can be configured to transition from displaying a third image to displaying a fourth image at the selected time, thereby coordinating the transitioning of displayed images among the display assemblies. It is contemplated that conventional image processing software can be used to determine the configuration and size of each image with respect to the configuration and size of a corresponding display assembly.

Connectors for Display Assemblies Having Side Portions with Two Projections

In further aspects, and with reference to FIGS. 3A-5C, the system 150 can further comprise a connector 160 (optionally, a plurality of connectors). In use, it is contemplated that each side portion 22 of the frame 20 of a first display assembly 10 of the plurality of display assemblies can be configured for connection to an aligned side portion of a frame of a second display assembly using the connector 160 when the connector is at least partially received within the receiving spaces 30 of the aligned side portions of the frames of the first and second display assemblies.

Optionally, in exemplary aspects, the connector 160 can comprise (a) an elongate body 162 having opposed front and rear surfaces 164, 166; and (b) first and second projections 168, 172 extending from the rear surface of the elongate body. In these aspects, the first and second projections 168, 172 can be configured for receipt within respective receiving spaces 30 of the aligned side portions of the frames of the first and second display assemblies. Optionally, in additional aspects, the first and second projections 168, 172 can be configured for frictional engagement with portions of the frames 20 of the first and second display assemblies that define the respective receiving spaces 30 of the aligned side portions of the frames of the first and second display assemblies.

Additionally, or alternatively, in other aspects, the first and second projections 168, 172 of the connector 160 can be biased to a closed position in which distal end portions 169, 173 of the first and second projections extend toward one another. In these aspects, upon positioning of the first and second projections 168, 172 of the connector 160 within the respective receiving spaces 30 of the aligned side portions of the frames of the first and second display assemblies, the first and second projections of the connector can be configured to apply a clamping force against the aligned side portions of the frames of the first and second display assemblies (more specifically, against the interior surfaces of the first projections 26 of the side portions). Optionally, the distal end portions 169, 173 of the first and second projections 168, 172 of the connector 160 can comprise rubber or a coating material that reduces the risk of damage to the frame 20 while providing sufficient gripping strength. In exemplary aspects, the connector 160 can optionally comprise first and second handles 170, 174 respectively secured to the first and second projections 168, 172 of the connector 160. Optionally, in these aspects, the system 150 can further comprise an engagement tool (not shown) configured to simultaneously engage the first and second handles 170, 174 and move the first and second projections 168, 172 of the connector 160 away from the closed position toward an open position. One suitable example of such an engagement tool is a set of pliers having a complementary shape for engagement with end portions of the handles that project above the front surface of the connector.

Optionally, it is contemplated that the connectors 160 disclosed herein can be angularly oriented to permit connection of a second display assembly to a first display assembly at a desired angle. For example, it is contemplated that the connectors 160 can be angularly oriented to permit connection of adjacent display assemblies at angles ranging from about 15 degrees to about 165 degrees or from about 60 degrees to about 120 degrees. It is contemplated that these angular orientations can be useful when constructing three-dimension displays, such as table-top displays. However, such angular orientations may also be useful in producing three-dimensional wall-mounted displays.

Methods of Using Display Assemblies Having Side Portions with Two Projections

As further disclosed herein, the disclosed system 150 can be used to selectively position display assemblies 10 on a selected surface, such as a wall. In exemplary aspects, a method can comprise using the connector of the system 150 to connect aligned side portions of the frames of the first and second display assemblies. In these aspects, the connector can be at least partially received within the receiving spaces of the aligned side portions of the frames of the first and second display assemblies. Thus, the disclosed system 150 allows for adjusting or removing connections between adjacent display assemblies without the need for removing the mounting assembly from the wall or other supporting surface. This capability also permits orientation adjustment of one or more display assemblies without the need for disassembling the entire system. In contrast, conventional approaches for securing frames require disassembly and/or removal of the entire frame system before the position of a single frame can be adjusted. Further, it is contemplated that the receipt of portions of a connector within receiving spaces of aligned side portions of adjacent frames can provide for secure but easily adjustable connections.

In additional aspects, the method can further comprise, following connection of the first and second display assemblies, attaching the first display assembly to a selected surface. In these aspects, the first display assembly can comprise a mount subassembly as disclosed herein, such as a mount subassembly having: (a) a base plate defining a slot positioned in alignment with a central opening of the backing of the first display assembly; (b) a bolt having a threaded shaft portion configured to be received through the slot of the base plate of the first display assembly and the central opening of the backing of the first display assembly; and (c) a nut configured for threaded engagement with a distal end of the threaded shaft portion of the bolt to secure the base plate of the first display assembly against a rear surface of the backing of the first display assembly. In further aspects, the slot of the base plate of the first display assembly can have a horizontal dimension that extends beyond the central opening of the backing of the first display assembly; and the method can further comprise selectively adjusting a position of the backing of the first display assembly relative to the base plate of the first display assembly.

In use, it is contemplated that the mount subassemblies as disclosed herein can allow for easy adjustment of the orientation of one or more display assemblies without the need for removing the mount subassembly from the wall (or other surface) and/or securing the mount subassembly at a new location on the wall (or other surface). This capability allows the disclosed system to accommodate a wide range of potential frame configurations from a single mount location.

In further aspects, it is contemplated that the second display assembly is not directly attached to the selected surface. In still further aspects, it is contemplated that the first display assembly is the only display assembly of the plurality of display assemblies that is attached to the selected surface.

Connectors for Display Assemblies Having Side Portions with One Projection

In additional aspects, the system 250 can further comprise a connector 260. In these aspects, each side portion of the frame of a first display assembly of the plurality of display assemblies can be configured for connection to an aligned side portion of a frame of a second display assembly using the connector when the connector is at least partially slidingly received within the receiving spaces of the aligned side portions of the frames of the first and second display assemblies.

Optionally, in exemplary aspects, the connector 260 can comprise an elongate body 266 having front and rear engagement portions 268, 278 that respectively define front and rear surfaces 262, 264 of the connector. In these aspects, each of the front and rear engagement portions 268, 278 can comprise opposed first and second guide portions 270, 272, 280, 282 extending outwardly in opposite directions from the elongate body 266. In use, the first guide portion 270 of the front engagement portion 268 can be configured for at least partial insertion within the first receiving space 228 of the first display assembly, the first guide portion 280 of the rear engagement portion 278 can be configured for at least partial insertion within the second receiving space 230 of the first display assembly, the second guide portion 272 of the front engagement portion can be configured for at least partial insertion within the first receiving space of the second display assembly, and the second guide portion 282 of the rear engagement portion 278 can be configured for at least partial insertion within the second receiving space of the second display assembly. In exemplary aspects, it is contemplated that each guide portion 270, 272, 280, 282 can have an L-shaped profile or a substantially L-shaped profile. In these aspects, it is contemplated that, extending outwardly from a longitudinal axis of the elongate body, the guide portion can have a first segment that is perpendicular or substantially perpendicular to the minimal diameter portion of the elongate body as shown in FIGS. 10A-10B, and a second segment that is perpendicular or substantially perpendicular to the first segment (and parallel or substantially parallel to the minimal diameter portion of the elongate body). More generally, it is contemplated that the guide portions can have compound shapes that permit at least a portion of the guide portions to remain outside the receiving spaces of the projections of the frames while other portions of the guide portions are received within the receiving spaces.

Optionally, the system 250 can further comprise a coupling subassembly configured to securely fix a position of the connector relative to the aligned side portions of the first and second display assemblies.

In one exemplary aspect, and with reference to FIGS. 14A-15D, the coupling subassembly 290 can comprise first and second elongate bodies 292. In this aspect, each elongate body 292 can have: opposed front and rear surfaces; and a projection 295 extending outwardly from the rear surface of the elongate body. It is contemplated that the projection 295 can have a thickness less than a thickness of the elongate body 292. In use, the projection of the first elongate body can be configured for insertion between, and frictional engagement with, the first guide portion of the front engagement portion of the connector and the outer surface of the base portion of the frame of the first display assembly. In use, the projection of the second elongate body can be configured for insertion between, and frictional engagement with, the second guide portion of the front engagement portion of the connector and the outer surface of the base portion of the frame of the second display assembly.

Optionally, and with reference to FIGS. 15A-15D, the front engagement portion 268 of the connector 260 can define opposed axial slots 274 that are configured to receive a portion of the projections 295 of the first and second elongate bodies 292 of the coupling subassembly 290 (as the projections are inserted between the front engagement portion of the connector and the base portion of the frame).

Optionally, the front engagement portion 268 of the connector 260 and the first and second elongate bodies 292 of the coupling subassembly 290 can comprise respective magnets 276, 298 that are configured for alignment with one another to establish a magnetic attraction between the magnets of the connector and the coupling subassembly. Optionally, it is contemplated that the magnets 298 of the first and second elongate bodies 292 of the coupling subassembly 290 and the front engagement portion 268 of the connector 260 can be respectively operatively associated with the front surface of the front engagement portion of the connector and a bottom surface of the first and second elongate bodies. In exemplary aspects, it is contemplated that the magnets can be fixed to the front engagement portion and the first and second elongate bodies such that each magnet operates with a single, consistent polarity (that is opposite the polarity of the magnet with which it is aligned at maximum frictional engagement). Optionally, it is contemplated that the front engagement portion and the first and second elongate bodies can define receptacles that are configured to securely receive one or more magnets.

Figure 16A:
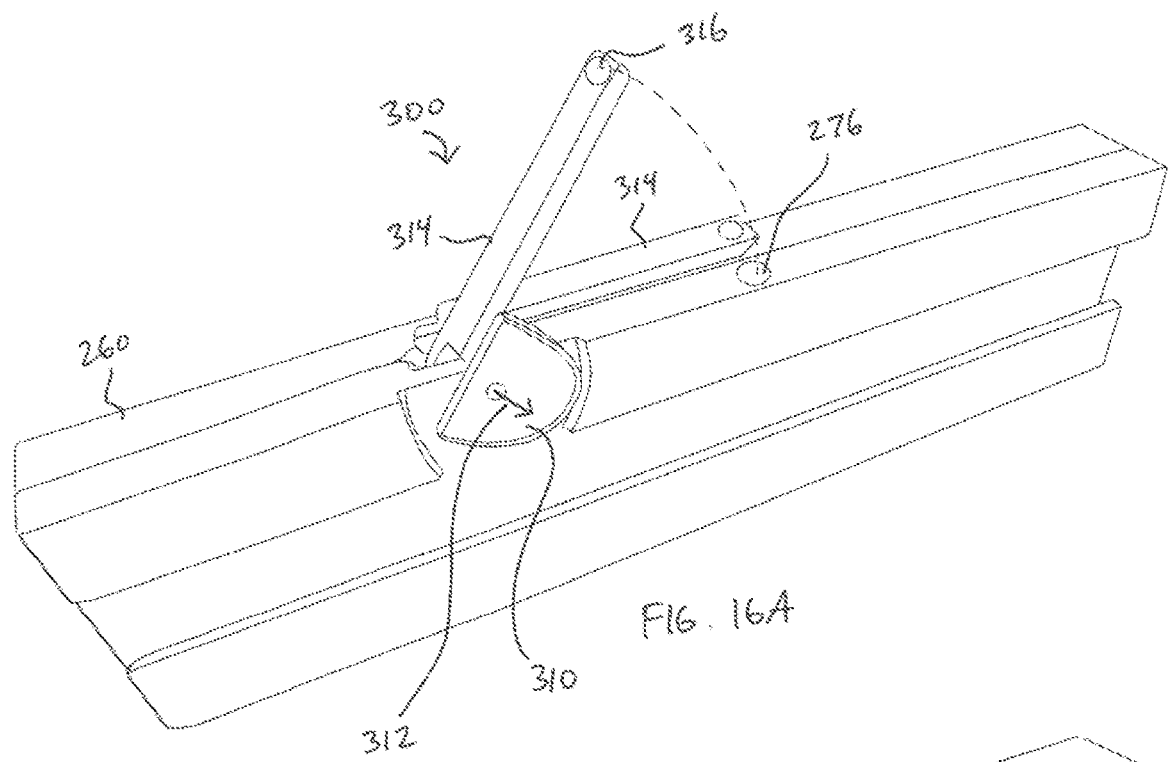
FIGS. 16A-16B depict an exemplary coupling subassembly that is incorporated into an exemplary connector as disclosed herein. As shown, the coupling assembly can include engagement wheels that are selectively rotatable relative to the connector to increase or decrease frictional engagement with a portion of a side portion of a frame of a display assembly as disclosed herein.
Figure 16B:
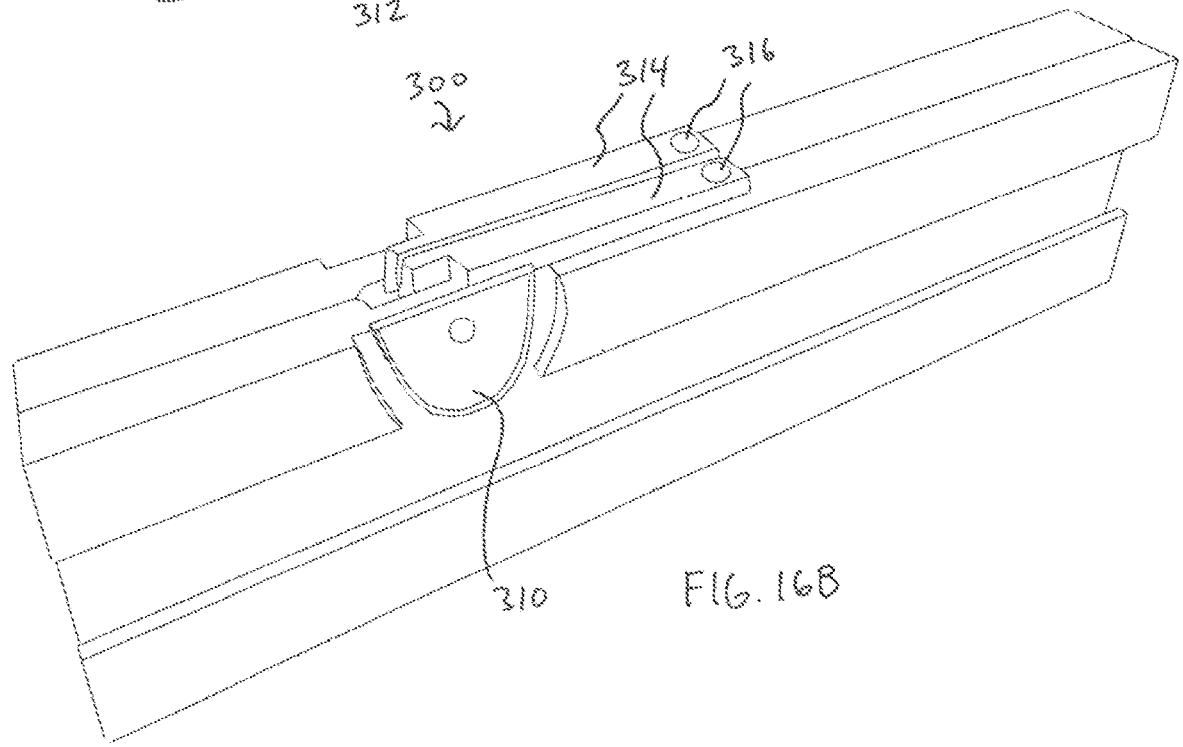

In another exemplary aspect, and with reference to FIGS. 16A-16B, the coupling subassembly 300 can comprise first and second engagement wheels 310 respectively rotationally coupled to the first and second guide portions 270, 272 of the front engagement portion 268 of the connector 260. In this aspect, the first and second engagement wheels 310 can be configured for rotation relative to a rotation axis 312 that is perpendicular to a length of the connector. In another aspect, the coupling subassembly 300 can further comprise first and second actuator arms 314 respectively coupled to the first and second engagement wheels 310 and configured to effect rotation of the first and second engagement wheels relative to the rotation axis. In use, it is contemplated that rotation of the first and second engagement wheels in a first direction can produce increased frictional engagement between the engagement wheels and the projections of the frames of the aligned side portions of the first and second display assemblies, and that rotation of the first and second engagement wheels in a second direction opposed from the first direction can produce reduced frictional engagement between the engagement wheels and the projections of the frames of the aligned side portions of the first and second display assemblies.

In further aspects, the first and second actuator arms 314 and the front engagement portion of the connector can comprise respective magnets 316, 276 that are configured for alignment with one another to establish a magnetic attraction between the actuator arms and the connector when the first and second engagement wheels have reached maximum frictional engagement with the projections of the frames of the aligned side portions of the first and second display assemblies. Optionally, it is contemplated that the magnets of the first and second actuator arms and the front engagement portion of the connector can be respectively operatively associated with the front surface of the front engagement portion of the connector and a bottom surface of the first and second actuator arms. In exemplary aspects, it is contemplated that the magnets can be fixed to the front engagement portion and the first and second actuator arms such that each magnet operates with a single, consistent polarity (that is opposite the polarity of the magnet with which it is aligned at maximum frictional engagement). Optionally, it is contemplated that the front engagement portion and the first and second actuator arms can define receptacles that are configured to securely receive one or more magnets.

Kits

Packaging kits comprising articles of manufacture, devices and systems of the present disclosure are described herein. The kits can comprise, for example, at least one display assembly having a frame 20,210, a backing 50, and at least one cover 110 as described herein. The kits can further comprise components of a mount subassembly 80 as disclosed herein. The kits can further comprise a connector 160, 260 as disclosed herein. When a connector 260 is provided, the kits can further include a coupling subassembly 290, 300. The kits can further comprise instructions for assembling the parts of the display assembly 10, 200 together as described herein. In another aspect, the kits can comprise instructions for attaching, securing or connecting a mount subassembly 80 to a selected surface as described herein. In still further aspects, the kit can comprise instructions for connecting the display assembly 10, 200 to at least one other display assembly using a connector as disclosed herein. In additional optional aspects, the kit can comprise a container (e.g., a box) that encloses the described products and that can be selectively opened to provide access to the products.

Exemplary Aspects

Aspect 1: A display assembly comprising: a frame having a plurality of side portions that cooperate to define a central opening that is configured to receive at least one visual feature, wherein at least one side portion of the frame comprises: a base portion defining a portion of a rear surface of the frame; and first and second projections extending from the base portion in a first direction away from the rear surface of the frame, wherein the first and second projections define a receiving space that extends along a length of the side portion, and wherein the receiving space is configured to at least partially receive a portion of a connector that is inserted into the receiving space in a second direction opposite the first direction.

Aspect 2: The display assembly of aspect 1, wherein the first projection of the at least one side portion of the frame defines a portion of an outer edge of the frame.

Aspect 3: The display assembly of aspect 2, wherein the at least one side portion of the frame has an inner edge portion that defines an inner edge of the frame, and wherein the second projection of the at least one side portion of the frame is positioned radially between the receiving space and the inner edge portion.

Aspect 4: The display assembly of aspect 3, wherein the first projection of the at least one side portion of the frame has a first height relative to the rear surface of the frame, wherein the second projection of the at least one side portion of the frame has a second height relative to the rear surface of the frame, and wherein the second height is greater than the first height.

Aspect 5: The display assembly of aspect 4, wherein the inner edge portion of the at least one side portion of the frame is recessed from the second projection in the second direction to define a ledge.

Aspect 6: The display assembly of aspect 5, wherein the ledge has a height relative to the rear surface of the frame that is less than the first height.

Aspect 7: The display assembly of aspect 6, wherein the first and second projections have respective thicknesses, and wherein the thickness of the first projection is less than the thickness of the second projection.

Aspect 8: The display assembly of any one of aspects 1-7, wherein the first and second projections and the inner edge portion of the at least one side portion of the frame are integrally formed as a unitary, monolithic structure.

Aspect 9: The display assembly of any one of aspects 1-7, wherein the at least one side portion of the frame comprises each side portion of the frame.

Aspect 10: The display assembly of aspect 9, wherein the first and second projections and the receiving space extend circumferentially and contiguously around the central opening of the frame.

Aspect 11: The display assembly of aspect 10, wherein the plurality of side portions comprises at least three side portions.

Aspect 12: The display assembly of aspect 10, wherein the plurality of side portions comprises at least four side portions.

Aspect 13: The display assembly of any one of aspects 1-12, further comprising a backing having a front wall and an opposed back wall, wherein at least a portion of the backing is configured for selective operative coupling to the frame of a respective display assembly, and wherein, upon operative coupling of the backing to the frame of the display assembly, at least a portion of the backing is positioned in communication with the central opening.

Aspect 14: The display assembly of aspect 13, further comprising at least one support member configured to support the display assembly in an operative position relative to a selected surface.

Aspect 15: The display assembly of aspect 14, wherein the at least one support member is configured to secure the display assembly to the selected surface.

Aspect 16: The display assembly of aspect 14, wherein the at least one support member comprises a strut back, a stand, a metal tab, a hole, a bracket, a wire, a cleat, a plaque with at least one magnetic attachment point, or combinations thereof.

Aspect 17: The display assembly of aspect 15, wherein the backing has a central opening and first and second leveling tools oriented perpendicular to one another, and wherein the at least one support member comprises a mount subassembly having: a base plate defining a slot positioned in alignment with the central opening of the backing; a bolt having a threaded shaft portion configured to be received through the slot of the base plate and the central opening of the backing; and a nut configured for threaded engagement with a distal end of the threaded shaft portion of the bolt to secure the base plate against a rear surface of the backing.

Aspect 18: The display assembly of aspect 17, wherein the slot of the base plate has a horizontal dimension that extends beyond the central opening of the backing to permit selective adjustment of the position of the backing relative to the base plate.

Aspect 19: The display assembly of aspect 18, wherein the mount subassembly further comprises a rubber gasket having a slot that is positioned in alignment with the slot of the base plate and configured for positioning between the base plate and the backing to permit receipt of the threaded shaft portion of the bolt through the base plate, the rubber gasket, and the backing.

Aspect 20: The display assembly of any one of aspects 17-19, wherein the frame comprises at least one alignment feature extending inwardly from at least one side portion of the frame, wherein the at least one alignment feature defines an alignment opening, wherein the backing defines at least one peripheral opening, and wherein each peripheral opening of the backing is configured to be positioned in alignment with a corresponding alignment opening of the at least one alignment feature.

Aspect 21: The display assembly of aspect 20, wherein the at least one alignment feature comprises opposed first and second alignment features, wherein each of the first and second alignment features defines a respective alignment opening, and wherein the at least one peripheral opening of the backing comprises opposed first and second peripheral openings.

Aspect 22: The display assembly of any one of aspects 20-21, further comprising: at least one peripheral fastener, each peripheral fastener being configured for receipt through a corresponding peripheral opening of the backing and a corresponding alignment opening of the at least one alignment feature; and at least one peripheral nut configured for threaded engagement with a distal end of a corresponding peripheral fastener of the at least one peripheral fastener.

Aspect 23: The display assembly of aspect 22, wherein the at least one peripheral opening of the backing comprises opposed first and second alignment slots that permit adjustment of the position of a respective peripheral fastener relative to a length of the corresponding alignment slot.

Aspect 24: The display assembly of aspect 23, wherein the first and second alignment features of the frame extend from the inner surface of the frame along a first axis, and wherein the first and second alignment slots are oriented parallel or substantially parallel to the first axis.

Aspect 25: The display assembly of aspect 24, wherein the backing is selectively expandable relative to the first axis, wherein the backing comprises at least one expansion portion that is slidably coupled to a base portion of the backing to permit movement of the expansion portion along the first axis, and wherein the base portion and the expansion portion of the backing define respective slot portions that cooperate to form at least one of the first and second alignment slots of the backing.

Aspect 26: The display assembly of any one of aspects 17-25, wherein the base plate defines at least one attachment opening spaced outwardly from the slot of the base plate, and wherein the display assembly further comprises at least one attachment fastener configured for receipt through the at least one attachment opening of the base plate to secure the display assembly to the selected surface.

Aspect 27: The display assembly of aspect 26, wherein the backing defines at least one attachment opening positioned for alignment with a corresponding attachment opening of the base plate.

Aspect 28: The display assembly of any one of aspects 1-27, further comprising a cover extending over at least a portion of the central opening of the frame.

Aspect 29: The display assembly of aspect 28, wherein the cover is transparent or substantially transparent.

Aspect 30: The display assembly of aspect 29, wherein the cover comprises plastic, glass, an acrylic material, or combinations thereof.

Aspect 31: The display assembly of any one of aspects 5-7, further comprising a reinforcement material that has a rear surface configured to rest on the ledge of the frame and a front surface configured to support at least one visual feature of the plurality of visual features within the central opening of the frame, and wherein the cover is configured to permit viewing of the at least one visual feature through the cover.

Aspect 32: The display assembly of aspect 31, wherein the front surface of the reinforcement material comprises a canvas, a chalkboard, a cork board, a bulletin board, a whiteboard, a magnetic board, drawing paper, or combinations thereof.

Aspect 33: The display assembly of aspect 31, wherein at least one display surface is secured to the front surface of the reinforcement material, and wherein the least one display surface comprises a canvas, a chalkboard, a cork board, a bulletin board, a whiteboard, a magnetic board, drawing paper, an electronic display panel, or combinations thereof.

Aspect 34: The display assembly of aspect 33, wherein the at least one display surface comprises an electronic display panel selected from the group consisting of an liquid crystal display (LCD) screen, a light emitting diode (LED) screen, an electroluminescent display (ELD) screen, a plasma display panel (PDP) screen, a digital light processing (DLP) screen, electronic paper, or combinations thereof.

Aspect 35: The display assembly of any one of the preceding claims, wherein the frame of the display assembly comprises wood, plastic, acrylic, vinyl, fabric, metal, stone, or combinations thereof.

Aspect 36: A system comprising a plurality of display assemblies as recited in any one of the preceding claims, wherein at least a first display assembly of the plurality of display assemblies is configured to be secured to a selected surface.

Aspect 37: The system of aspect 36, wherein the frame of at least one display assembly of the plurality of display assemblies has a different shape than the frame of at least one other display assembly of the plurality of display assemblies.

Aspect 38: The system of aspect 36, wherein the frame of at least one display assembly of the plurality of display assemblies has a different size than the frame of at least one other display assembly of the plurality of display assemblies.

Aspect 39: The system of any one of aspects 36-38, further comprising a connector, wherein each side portion of the frame of a first display assembly of the plurality of display assemblies is configured for connection to an aligned side portion of a frame of a second display assembly using the connector when the connector is at least partially received within the receiving spaces of the aligned side portions of the frames of the first and second display assemblies.

Aspect 40: The system of aspect 39, wherein the connector comprises: an elongate body having opposed front and rear surfaces; and first and second projections extending from the rear surface of the elongate body, wherein the first and second projections are configured for receipt within respective receiving spaces of the aligned side portions of the frames of the first and second display assemblies.

Aspect 41: The system of aspect 40, wherein the first and second projections are configured for frictional engagement with portions of the frames of the first and second display assemblies that define the respective receiving spaces of the aligned side portions of the frames of the first and second display assemblies.

Aspect 42: The system of aspect 40, wherein the first and second projections of the connector are biased to a closed position in which distal end portions of the first and second projections extend toward one another, wherein upon positioning of the first and second projections of the connector within the respective receiving spaces of the aligned side portions of the frames of the first and second display assemblies, the first and second projections of the connector are configured to apply a clamping force against the aligned side portions of the frames of the first and second display assemblies.

Aspect 43: The system of aspect 42, wherein the distal end portions of the first and second projections of the connector comprise rubber.

Aspect 44: The system of aspect 42 or aspect 43, wherein the connector comprises first and second handles respectively secured to the first and second projections of the connector.

Aspect 45: The system of aspect 44, further comprising an engagement tool configured to simultaneously engage the first and second handles and move the first and second projections of the connector away from the closed position toward an open position.

Aspect 46: A method comprising: using a system according to any one of claims 39-45; and using the connector of the system to connect aligned side portions of the frames of the first and second display assemblies, wherein the connector when the connector is at least partially received within the receiving spaces of the aligned side portions of the frames of the first and second display assemblies.

Aspect 47: The method of aspect 46, further comprising, following connection of the first and second display assemblies: attaching the first display assembly to a selected surface, wherein the first display assembly comprises a mount subassembly having: a base plate defining a slot positioned in alignment with a central opening of the backing of the first display assembly; a bolt having a threaded shaft portion configured to be received through the slot of the base plate of the first display assembly and the central opening of the backing of the first display assembly; and a nut configured for threaded engagement with a distal end of the threaded shaft portion of the bolt to secure the base plate of the first display assembly against a rear surface of the backing of the first display assembly, wherein the slot of the base plate of the first display assembly has a horizontal dimension that extends beyond the central opening of the backing of the first display assembly; and selectively adjusting a position of the backing of the first display assembly relative to the base plate of the first display assembly.

Aspect 48: The method of aspect 47, wherein the second display assembly is not directly attached to the selected surface.

Aspect 49: The method of aspect 47 or aspect 48, wherein the first display assembly is the only display assembly of the plurality of display assemblies that is attached to the selected surface.

Aspect 50: The method of any one of aspects 47-49, wherein the selected surface is a wall.

Aspect 51: A display assembly comprising: a frame having a plurality of side portions that cooperate to define a central opening that is configured to receive at least one visual feature, the central opening having a central axis passing through a center point of the frame, wherein at least one side portion of the frame comprises: a base portion having opposed inner and outer surfaces; and a projection having an arm section that extends outwardly from the outer surface of the base portion and first and second rail sections extending from the arm section in opposite directions that are parallel or substantially parallel to the central axis, wherein the first rail section, the arm section, and the outer surface of the base portion cooperate to define a first receiving space, and wherein the second rail section, the arm section, and the outer surface of the base portion cooperate to define a second receiving space, wherein each receiving space is configured to at least partially receive a portion of a connector that is slidingly inserted into the receiving spaces in a direction perpendicular or substantially perpendicular to the central axis.

Aspect 52: The display assembly of aspect 51, wherein the at least one side portion comprises each side portion of the frame.

Aspect 53: The display assembly of aspect 51 or aspect 52, wherein the inner surface of the base portion of each side portion of the at least one side portion defines a ledge that is recessed from a front surface of the frame.

Aspect 54: The display assembly of any one of aspects 51-53, wherein the first and second rail sections do not extend along an entire length of the projection of the side portion of the at least one side portion of the frame.

Aspect 55: A system comprising a plurality of display assemblies as recited in any one of aspects 51-54, wherein at least a first display assembly of the plurality of display assemblies is configured to be secured to a selected surface.

Aspect 56: The system of aspect 55, wherein the frame of at least one display assembly of the plurality of display assemblies has a different shape than the frame of at least one other display assembly of the plurality of display assemblies.

Aspect 57: The system of aspect 55, wherein the frame of at least one display assembly of the plurality of display assemblies has a different size than the frame of at least one other display assembly of the plurality of display assemblies.

Aspect 58: The system of any one of aspects 55-57, further comprising a connector, wherein each side portion of the frame of a first display assembly of the plurality of display assemblies is configured for connection to an aligned side portion of a frame of a second display assembly using the connector when the connector is at least partially slidingly received within the receiving spaces of the aligned side portions of the frames of the first and second display assemblies.

Aspect 59: The system of aspect 58, wherein the connector comprises: an elongate body having front and rear engagement portions that respectively define front and rear surfaces of the connector, wherein each of the front and rear engagement portions comprises opposed first and second guide portions extending outwardly in opposite directions from the elongate body portion, wherein the first guide portion of the front engagement portion is configured for at least partial insertion within the first receiving space of the first display assembly, wherein the first guide portion of the rear engagement portion is configured for at least partial insertion within the second receiving space of the first display assembly, wherein the second guide portion of the front engagement portion is configured for at least partial insertion within the first receiving space of the second display assembly, wherein the second guide portion of the rear engagement portion is configured for at least partial insertion within the second receiving space of the second display assembly.

Aspect 60: The system of aspect 59, further comprising a coupling subassembly configured to securely fix a position of the connector relative to the aligned side portions of the first and second display assemblies.

Aspect 61: The system of aspect 60, wherein the coupling subassembly comprises: first and second elongate bodies, each elongate body having: opposed front and rear surfaces; and a projection extending outwardly from the rear surface of the elongate body, wherein the projection has a thickness less than a thickness of the elongate body, wherein the projection of the first elongate body is configured for insertion between, and frictional engagement with, the first guide portion of the front engagement portion of the connector and the outer surface of the base portion of the frame of the first display assembly, and wherein the projection of the second elongate body is configured for insertion between, and frictional engagement with, the second guide portion of the front engagement portion of the connector and the outer surface of the base portion of the frame of the second display assembly.

Aspect 62: The system of aspect 61, wherein the front engagement portion of the connector defines opposed axial slots that are configured to receive a portion of the projections of the first and second elongate bodies of the coupling assembly.

Aspect 63: The system of aspect 61 or aspect 62, wherein the front engagement portion of the connector and the first and second elongate bodies of the coupling subassembly comprise respective magnets that are configured for alignment with one another to establish a magnetic attraction between the magnets of the connector and the coupling subassembly.

Aspect 64: The system of aspect 60, wherein the coupling subassembly comprises: first and second engagement wheels respectively rotationally coupled to the first and second guide portions of the front engagement portion of the connector, wherein the first and second engagement wheels are configured for rotation relative to a rotation axis that is perpendicular to a length of the connector; and first and second actuator arms respectively coupled to the first and second engagement wheels and configured to effect rotation off the first and second engagement wheels relative to the rotation axis, wherein rotation of the first and second engagement wheels in a first direction produces increased frictional engagement between the engagement wheels and the projections of the frames of the aligned side portions of the first and second display assemblies, and wherein rotation of the first and second engagement wheels in a second direction opposed from the first direction produces reduced frictional engagement between the engagement wheels and the projections of the frames of the aligned side portions of the first and second display assemblies.

Aspect 65: The system of aspect 64, wherein the first and second actuator arms and the front engagement portion of the connector comprise respective magnets that are configured for alignment with one another to establish a magnetic attraction between the actuator arms and the connector when the first and second engagement wheels have reached maximum frictional engagement with the projections of the frames of the aligned side portions of the first and second display assemblies.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A system comprising: a plurality of display assemblies, each display assembly of the plurality of display assemblies comprising: a frame having a plurality of side portions that cooperate to define a central opening that is configured to receive at least one visual feature, wherein at least one side portion of the frame comprises: a base portion defining a portion of a rear surface of the frame; and first and second projections extending from the base portion in a first direction away from the rear surface of the frame, wherein the first and second projections define a receiving space that extends along a length of the side portion, wherein the receiving space is configured to at least partially receive a portion of a connector that is inserted into the receiving space in a second direction opposite the first direction, wherein the first projection of the at least one side portion of the frame defines a portion of an outer edge of the frame, and wherein the at least one side portion of the frame has an inner edge portion that defines an inner edge of the frame, and wherein the second projection of the at least one side portion of the frame is positioned transversely between the receiving space and the inner edge portions and wherein the second projection is transversely spaced from the inner edge and projects in the first direction relative to the inner edge portion; and a connector, wherein each side portion of the frame of a first display assembly of the plurality of display assemblies is configured for connection to an aligned side portion of a frame of a second display assembly using the connector when the connector is at least partially received within the receiving spaces of the aligned side portions of the frames of the first and second display assemblies, wherein at least the first display assembly of the plurality of display assemblies is configured to be secured to a selected surface; and the connector comprises: a body having opposed front and rear surfaces; and first and second projections extending from the rear surface of the body, wherein the first and second projections are configured for receipt within respective receiving spaces of the aligned side portions of the frames of the first and second display assemblies, and wherein first and second handles are secured to the first and second projections and an engagement tool is configured to simultaneously engage the first and second handles and move the first and second projections away from a closed position toward an open position.

2. The system of claim 1, wherein the connector comprises:
a body having opposed front and rear surfaces; and
first and second projections extending from the rear surface of the body,
wherein the first and second projections are configured for receipt within respective receiving spaces of the aligned side portions of the frames of the first and second display assemblies,
wherein the first and second projections are biased to a closed position in which distal end portions of the first and second projections extend toward one another to apply a clamping force against the aligned side portions of the frames of the first and second display assemblies.

3. The system of claim 1, wherein the inner edge portion of the at least one side portion of the frame of each display assembly of the plurality of display assemblies is recessed from the second projection in the second direction to define a ledge.

4. The system of claim 3, wherein the first projection of the at least one side portion of the frame of each display assembly of the plurality of display assemblies has a first height relative to the rear surface of the frame, wherein the ledge has a height relative to the rear surface of the frame that is less than the first height.

5. A method comprising: connecting a first display assembly of a plurality of display assemblies to a second display assembly of the plurality of display assemblies, each display assembly of the plurality of display assemblies comprising: a frame having a plurality of side portions that cooperate to define a central opening that is configured to receive at least one visual feature, wherein at least one side portion of the frame comprises: a base portion defining a portion of a rear surface of the frame; and first and second projections extending from the base portion in a first direction away from the rear surface of the frame, wherein the first and second projections define a receiving space that extends along a length of the side portion, and wherein the receiving space is configured to at least partially receive a portion of a connector that is inserted into the receiving space in a second direction opposite the first direction, wherein the first projection of the at least one side portion of the frame defines a portion of an outer edge of the frame, and wherein the at least one side portion of the frame has an inner edge portion that defines an inner edge of the frame, and wherein the second projection of the at least one side portion of the frame is positioned transversely between the receiving space and the inner edge portion, wherein the second projection is transversely spaced from the inner edge and projects in the first direction relative to the inner edge portion; and wherein a side portion of plurality of side portions of the frame of the first display assembly is connected to an aligned side portion of the plurality of side portions of the second display assembly using a connector, wherein the connector is at least partially received within the receiving spaces of the aligned side portions of the frames of the first and second display assemblies; and securing at least the first display assembly of the plurality of display assemblies to a surface; and the connector comprises: a body having opposed front and rear surfaces; and first and second projections extending from the rear surface of the body, wherein the first and second projections are configured for receipt within respective receiving spaces of the aligned side portions of the frames of the first and second display assemblies, and wherein first and second handles are secured to the first and second projections and an engagement tool is configured to simultaneously engage the first and second handles and move the first and second projections away from a closed position toward an open position.

6. The system of claim 4, wherein the first and second projections of the at least one side portion of the frame of each display assembly of the plurality of display assemblies have respective thicknesses, and wherein the thickness of the first projection is less than the thickness of the second projection.

7. The system of claim 2, wherein the first and second projections and the receiving space of each side portion of the at least one side portion of the frame of each display assembly adjoin the respective first and second projections and respective receiving spaces of adjacent side portions of the at least one side portion to cooperatively extend circumferentially and contiguously around the central opening of the frame.

8. The method of claim 5, wherein the connector comprises:
a body having opposed front and rear surfaces; and
first and second projections extending from the rear surface of the body,
wherein the first and second projections are configured for receipt within respective receiving spaces of the aligned side portions of the frames of the first and second display assemblies,
wherein the first and second projections are biased to a closed position in which distal end portions of the first and second projections extend toward one another to apply a clamping force against the aligned side portions of the frames of the first and second display assemblies.

9. The method of claim 5, wherein the inner edge portion of the at least one side portion of the frame of each display assembly of the plurality of display assemblies is recessed from the second projection in the second direction to define a ledge.

10. The method of claim 9, wherein the first projection of the at least one side portion of the frame of each display assembly of the plurality of display assemblies has a first height relative to the rear surface of the frame, wherein the ledge has a height relative to the rear surface of the frame that is less than the first height.

11. The system of claim 1, wherein the receiving space has a rectangular cross section with planar opposing surfaces.

12. The method of claim 5, wherein the receiving space has a rectangular cross section with planar opposing surfaces.

13. The method of claim 10, wherein the first and second projections of the at least one side portion of the frame of each display assembly of the plurality of display assemblies have respective thicknesses, and wherein the thickness of the first projection is less than the thickness of the second projection.

14. The method of claim 8, wherein the first and second projections and the receiving space of each side portion of the at least one side portion of the frame of each display assembly adjoin the respective first and second projections and respective receiving spaces of adjacent side portions of the at least one side portion to cooperatively extend circumferentially and contiguously around the central opening of the frame.

\* \* \* \* \*